United States Patent
Homer et al.

(10) Patent No.: US 8,290,835 B2
(45) Date of Patent: Oct. 16, 2012

(54) SYSTEMS, METHODS, AND APPARATUS FOR ESTABLISHING PAYEES BASED ON CLEARED ITEMS POSTED TO A FINANCIAL ACCOUNT

(75) Inventors: Robert T. Homer, Cumming, GA (US); Mary Elizabeth Lawson, Westerville, OH (US); Donald Kenneth Hobday, Jr., Blacklick, OH (US); Hans Daniel Dreyer, Pataskala, OH (US)

(73) Assignee: FISERV, Inc., Brookfield, WI (US)

( * ) Notice: Subject to any disclaimer, the term of this patent is extended or adjusted under 35 U.S.C. 154(b) by 352 days.

(21) Appl. No.: 12/473,851

(22) Filed: May 28, 2009

(65) Prior Publication Data
US 2010/0306091 A1 Dec. 2, 2010

(51) Int. Cl.
G07F 19/00 (2006.01)
G06Q 40/00 (2012.01)

(52) U.S. Cl. .................................... 705/34; 705/7
(58) Field of Classification Search ............. 705/34
See application file for complete search history.

(56) References Cited

U.S. PATENT DOCUMENTS

| | | | |
|---|---|---|---|
| 5,903,881 A | 5/1999 | Schrader et al. | |
| 6,493,685 B1 | 12/2002 | Ensel et al. | |
| 6,853,977 B1 | 2/2005 | Niwa | |
| 6,941,281 B1 | 9/2005 | Johnson | |
| 7,702,588 B2 | 4/2010 | Gilder et al. | |
| 7,756,786 B2 | 7/2010 | Trende et al. | |
| 7,792,720 B2 * | 9/2010 | Gallagher et al. | 705/35 |
| 2002/0082993 A1 | 6/2002 | Hoyos et al. | |
| 2002/0111886 A1 | 8/2002 | Chenevich et al. | |
| 2004/0039692 A1 | 2/2004 | Shields et al. | |
| 2004/0108376 A1 * | 6/2004 | Witherspoon | 235/379 |
| 2004/0133513 A1 | 7/2004 | McCoy et al. | |
| 2004/0148258 A1 | 7/2004 | Tillett | |
| 2007/0050292 A1 | 3/2007 | Yarbrough | |
| 2008/0021828 A1 | 1/2008 | Pfeiffer et al. | |
| 2008/0091530 A1 | 4/2008 | Egnatios et al. | |
| 2008/0126145 A1 * | 5/2008 | Rackley, III et al. | 705/7 |
| 2008/0133407 A1 | 6/2008 | Guillory et al. | |
| 2010/0161466 A1 * | 6/2010 | Gilder | 705/34 |

OTHER PUBLICATIONS

"Data General to Unveil Fiber Channel Mgm't . . . ", Newsbytes News Network, Aug. 10, 1998.*
Newsbytes News Network; "Data General to Unveil Fiber Channel Mgm't Next Monday (Data General will introduce the Navisphere storage management package that is designed to support emerging SANs of centrally managed distributed RAID arrays);" Aug. 10, 1998; p. 1.

(Continued)

Primary Examiner — Garcia Ade
(74) Attorney, Agent, or Firm — Sutherland Asbill & Brennan LLP

(57) ABSTRACT

Systems, methods, and apparatus for establishing payees based on cleared items posted to a financial account are provided. Information associated with a cleared item posted to a financial account of a consumer may be obtained. Based at least in part on the obtained information, a payee associated with the cleared item may be identified. A form may be generated for activating, at a service provider, at least one of online payment functionality for payments made to the payee by the service provider on behalf of the consumer or electronic bill presentment of billing information of the payee to the consumer through the service provider. The form may be transmitted to a network entity for presentation to the consumer.

25 Claims, 6 Drawing Sheets

OTHER PUBLICATIONS

Homer et al.; Non-Final Office Action mailed Sep. 29, 2011 for related U.S. Appl. No. 12/473,837.

Homer et al.; Final Office Action mailed Feb. 8, 2012 for related U.S. Appl. No. 12/473,837.

* cited by examiner

SYSTEMS, METHODS, AND APPARATUS FOR ESTABLISHING PAYEES BASED ON CLEARED ITEMS POSTED TO A FINANCIAL ACCOUNT

CROSS-REFERENCE TO RELATED APPLICATION

This application is related to co-pending U.S. patent application Ser. No. 12/473,837, filed May 28, 2009, and entitled "Systems, Methods, and Apparatus for Identifying Payees from Cleared Items Posted to a Financial Account," the disclosure of which is incorporated by reference herein in its entirety.

FIELD OF THE INVENTION

Embodiments of the invention relate generally to online banking, and more particularly, to the identification of potential payees in online payment functionality for a customer based on cleared items posted to a financial account.

BACKGROUND OF THE INVENTION

A wide variety of financial institutions provide online banking options to their customers. Online banking typically allows bank customers to review transactions that have posted to their financial accounts. These include "cleared items," such as debit transactions and check transactions that have been paid out of an account. Some of these transactions may be associated with payees not yet established as payees of the bank customer in associated online bill presentment and/or online payment functionality. Recurring payments may also be available or appropriate in association with such payees. Banks have found that greater customer use of electronic bill presentment and/or online payment functionality often increases the "stickiness" of the customer to the bank. However, bank customers may be slow to adopt significant use of online payment functionality for a variety of reasons.

BRIEF DESCRIPTION OF THE DRAWINGS

Reference will now be made to the accompanying drawings, which are not necessarily drawn to scale, and wherein.

DETAILED DESCRIPTION

Figure 1:
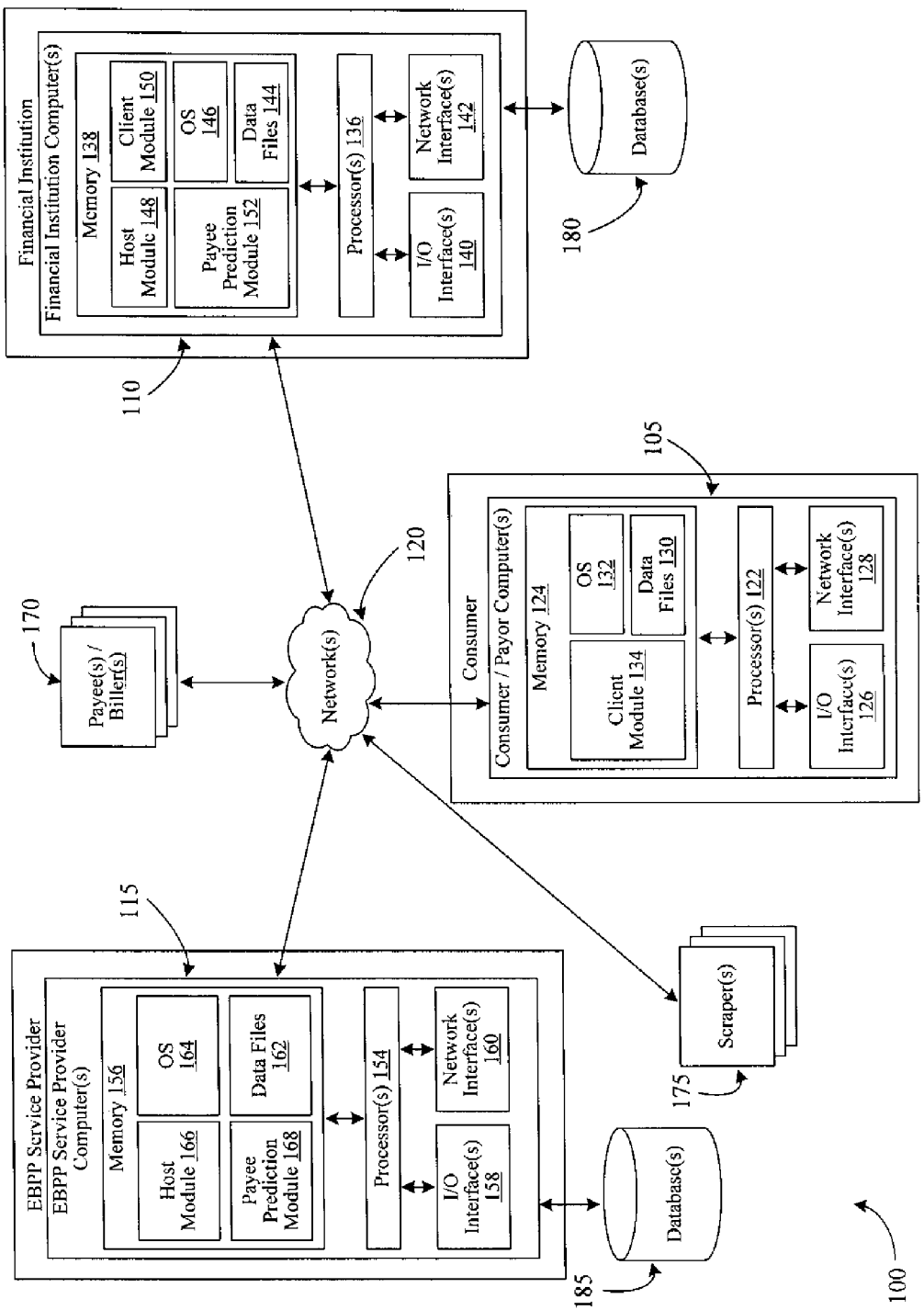
FIG. 1 illustrates an example overview of a system that allows for identifying and/or establishing payees from cleared items posted to a financial account, according to an example embodiment of the invention.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As used herein, the term "cleared item" may refer to information posted to and/or stored in association with a financial account, such as a bank account, regarding a completed transaction utilizing the financial account. A wide variety of information may be associated with a cleared item, for example, a posting date, a description of the item, an indication of whether the cleared item is a debit or credit, an amount, and/or a running balance for the financial account. Additionally, a wide variety of different types of cleared items may be posted to a financial account as desired in various embodiments of the invention, including but not limited to, automatic teller machine (ATM) and/or teller withdrawals, bank fees, check or currency deposits, electronic credits, online payments, paid checks, automated checks, debit card transactions, direct debit transactions, etc.

As used herein, the term "cleared items history" may refer to a collection or set of cleared items associated with a financial account. A wide variety of different types of sets of cleared items may be utilized as desired in various embodiments of the invention. For example, a cleared items history may include cleared items that have been posted to a financial account during a predetermined time period, such as, during the last month, during the last three months, etc. As another example, a cleared items history may include a predetermined number of cleared items that have been posted to a financial account, such as, the last 50 cleared items or last 100 cleared items that were posted.

As used herein, the term "consumer" may refer to an individual, small business customer, or other customer of a financial institution, such as a bank, credit union, etc. The financial institution may manage one or more financial accounts of the consumer, for example, a checking account, money market account, etc.

Embodiments of the invention can provide systems, methods, apparatus, means, and/or mechanisms by which payees may be identified from one or more cleared items posted to a financial account and suggestions and/or activation screens may be presented to a consumer for activating online payment services and/or electronic bill presentment for at least one of the identified payees. Information associated with one or more cleared items posted to a financial account, such as a bank account of a consumer, may be obtained. Based upon a consumer selection of a cleared item, a payee of the consumer associated with the cleared item may be identified from the cleared item information. The payee may be a payee that has not already been established as a payee for online payment services and/or electronic bill presentment. A suggestion to add the identified payee as a payee of the consumer for electronic bill presentment and/or online payment functionality may be generated along with an activation screen for adding the payee. Once accepted by a customer, a suggestion may facilitate a bill payment service activating electronic bill presentment for bills of the payee and/or the distribution of payments to the payee on behalf of the consumer.

An example system 100 for identifying and/or establishing or activating payees based upon cleared items posted to a financial account will now be described illustratively with respect to FIG. 1. In certain embodiments, the system 100 may include a consumer/payor computer 105, a financial institution computer 110, and an electronic bill payment and presentment (EBPP) service provider 115. For purposes of this disclosure, the consumer/payor computer 105 may be referred to as the consumer computer 105. Although various computing devices and/or computers are illustrated in FIG. 1 for the consumer/payor computer 105, the financial institution computer 110, and/or the EBPP service provider 115, it will be appreciated that these computers are associated with various individuals, businesses, and/or other entities. For example, the consumer/payor computer 105 may be associated with a consumer, the financial institution computer 110 may be associated with a suitable financial institution (e.g., bank), and the EBPP service provider 115 may be associated with a suitable business entity that provides electronic bill presentment and/or payment services to consumers. Additionally, as desired, the various individuals, businesses, and/or other entities may have any number of respective associated computers. A single computer is illustrated as being associated with each entity in FIG. 1 for ease in understanding various embodiments of the invention.

As desired, each of the consumer computer 105, financial institution computer 110, and/or EBPP service provider 115 may be one or more suitable computers, computing devices, and/or network entities that include one or more processors and/or processing devices that may be configured for accessing and reading associated computer-readable media having stored thereon data and/or computer-executable instructions for implementing the various methods of the invention. Additionally, in certain embodiments, the financial institution computer 110 and/or the EBPP service provider 115 may facilitate the identification of payees based upon cleared items posted to a financial account and the transmission or other communication of a suggestion and/or activation or enrollment screen to facilitate activation of electronic bill presentment and/or distribution of payments to an identified payee.

Generally, computers, including one or more of the consumer computer 105, financial institution computer 110, and/or EBPP service provider 115 may include or otherwise be associated with suitable hardware and/or software for transmitting and receiving data over one or more communications links or networks. These computers may also include other internal and peripheral components that are well known in the art. By executing computer-executable instructions or software instructions, each of the computers or network devices may form a special purpose computer or particular machine. As used herein, the term "computer-readable medium" describes any form of suitable memory that may be accessed by a processor associated with a computer.

The consumer computer 105 may be any suitable processor-driven device that facilitates interaction with a consumer and communications with other network devices. The consumer computer 105 may be, for example, a personal computer or network-enabled mobile device of a consumer. As desired, the consumer computer 105 may include any number of special purpose computers or other particular machines, application specific circuits, microcontrollers, personal computers, minicomputers, servers, and the like. In certain embodiments, the operations of the consumer computer 105 may be controlled by computer-executed or computer-implemented instructions that are executed by one or more processors associated with the consumer computer 105. The instructions may be embodied in one or more software components as desired in various embodiments of the invention. The execution of the instructions may form a special purpose computer or other particular machine that is operable to facilitate interaction with the consumer and communication with other network devices in order to receive suggestions and/or enrollment or activation screens to activate one or more payees for electronic bill presentment and/or distribution of payments on behalf of the consumer. The one or more processors that control the operations of the consumer computer 105 may be incorporated into the consumer computer 105 and/or in communication with the consumer computer 105 via one or more suitable networks. In certain embodiments of the invention, the operations and/or control of the consumer computer 105 may be distributed amongst several processing components.

The consumer computer 105 may include one or more processors 122, one or more memory devices 124, one or more input/output ("I/O") interface(s) 126, and one or more network interface(s) 128. The one or more memory devices 124 may be any suitable memory devices, for example, caches, read only memory devices, random access memory devices, magnetic storage devices, etc. The one or more memory devices 124 may store data, executable instructions, and/or various program modules utilized by the consumer computer 105, for example, data files 130, an operating system 132, and/or a client module 134. The data files 130 may include any suitable data that facilitates interaction with the financial institution computer 110 and/or the EBPP service provider 115. For example, the data files 130 may include, but are not limited to, profile information for the consumer, log-in and/or access information for the consumer, and/or financial information, billing information, and/or payment information that has been received from the financial institution computer 110 and/or the EBPP service provider 115. The operating system (OS) 132 may be a suitable software module that controls the general operation of the consumer computer 105. The OS 132 may also facilitate the execution of other software modules by the one or more processors 122, for example, the client module 134. The client module 132 may be a suitable software module, such as an Internet browser, that facilitates interaction between the consumer and the financial institution computer 110 and/or the EBPP service provider 115. In this regard, the consumer may request and/or access various financial information and/or billing information. Additionally, suggestions may be presented to the consumer for establishing electronic bill presentment and/or various bill payment functionality for one or more payees of the consumer.

The one or more I/O interfaces 126 may facilitate communication between the consumer computer 105 and one or more input/output devices, for example, one or more user interface devices, such as, a display, keypad, mouse or other pointing device, control panel, touch screen display, remote control, microphone, etc. that facilitate consumer or user interaction with the consumer computer 105. In this regard, one or more user preferences and/or commands associated with the operation of the consumer computer 105 may be received and processed.

The one or more network interfaces 128 may facilitate connection of the consumer computer 105 to one or more suitable networks, for example, a wide area network, the Internet, a cellular network, any wired network, any wireless network, etc. In this regard, the consumer computer 105 may receive and/or communicate information to other network components of the system 100, such as the financial institution computer 110 and/or the EBPP service provider 115.

Although a single consumer/payor computer 105 is illustrated in FIG. 1, as desired in various embodiments of the invention, any number of consumer/payor computers may be in communication with the financial institution computer 110 and/or the EBPP service provider 115. Furthermore, any number of consumer/payor computers may be associated with a particular consumer. In this regard, any number of consumers may be in communication with the financial institution computer 110 and/or the EBPP service provider 115. Additionally, a consumer/payor computer 105 may include more or less than the components illustrated in FIG. 1. The consumer/payor computer 105 illustrated in FIG. 1 is provided by way of example only.

With continued reference to FIG. 1, the financial institution computer 110 may be any suitable processor-driven device that facilitates interaction with other network devices of the system 100 and/or the provision of various online banking services. The financial institution computer 110 may be associated with a financial institution, such as a bank, that provides services for one or more financial accounts of the consumer, such as, a checking account, money market account, etc. As desired, the financial institution computer 110 may include any number of special purpose computers or other particular machines, application specific circuits, microcontrollers, personal computers, minicomputers, servers, and the like. In certain embodiments, the operations of the financial institution computer 110 may be controlled by computer-executed or computer-implemented instructions that are executed by one or more processors associated with the financial institution computer 110. The instructions may be embodied in one or more software components as desired in various embodiments of the invention. The execution of the instructions may form a special purpose computer or other particular machine that is operable to facilitate the provision of online banking services to one or more consumers and/or the transmission, communication, and/or presentation of one or more suggestions and/or activation screens to facilitate activation of one or more payees for electronic bill presentment and/or distribution of payments on behalf of the consumer. The one or more processors that control the operations of the financial institution computer 110 may be incorporated into the financial institution computer 110 and/or in communication with the financial institution computer 110 via one or more suitable networks. In certain embodiments of the invention, the operations and/or control of the financial institution computer 110 may be distributed amongst several processing components.

The financial institution computer 110 may include one or more processors 136, one or more memory devices 138, one or more input/output ("I/O") interface(s) 140, and one or more network interface(s) 142. The one or more memory devices 138 may be any suitable memory devices, for example, caches, read only memory devices, random access memory devices, magnetic storage devices, etc. The one or more memory devices 138 may store data, executable instructions, and/or various program modules utilized by the financial institution computer 110, for example, data files 144, an operating system 146, a client module 148, a host module 148, and/or a payee prediction module 152. The data files 144 may include any suitable data that facilitates the provision of online banking services, the identification of payees from one or more cleared items posted to a financial account, and/or the generation of one or more suggestions and/or activation screens to enroll the consumer for electronic bill presentment and/or the distribution of payments to an identified payee. For example, the data files 144 may include, but are not limited to, profile information for consumers, consumer preferences, log-in and/or access information for consumers, financial account information, other financial information, information associated with identified payees, information associated with bill presentment and/or payment services, and/or information associated with the EBPP service provider 115. The operating system (OS) 146 may be a suitable software module that controls the general operation of the financial institution computer 110. The OS 146 may also facilitate the execution of other software modules by the one or more processors 136, for example, the host module 148, the client module 150, and/or the payee prediction module 152. The host module 148 may be a suitable software module, such as a web server or other host server, that facilitates the establishment of a network session with another network device, such as the consumer computer 105 and/or the EBPP service provider 115. In this regard, the host module 148 may facilitate interaction between the financial institution computer 110 and the consumer computer 105. For example, the host module 148 may host an online banking session for the consumer computer 105. The client module 150 may be a suitable software module, such as an Internet browser or other dedicated software, that facilitates the establishment of a network session that is hosted by another network device, such as a network session that is hosted by a host module 166 of the EBPP service provider 115. In this regard, the financial institution computer 110 may communicate information to and/or receive information from the EBPP service provider 115, such as cleared item information, billing information, and/or bill payment information. Although network sessions between the financial institution computer 110 and the EBPP service provider 115 are described as being hosted by the EBPP service provider 115, as desired in various embodiments of the invention, a network session between the two entities may be hosted by the financial institution computer 110.

The payee prediction module 152 or payee suggestion module 152 may be a suitable software module that facilitates the identification of one or more payees from cleared items posted to a financial account. For example, the payee prediction module 152 may identify payees from one or more check transactions, converted check transactions, direct debit transactions, and/or debit care transaction. The payee prediction module 152 may additionally be operable to generate suggestions and/or activation or enrollment screens to establish electronic bill presentation and/or bill payment services for one or more identified payees. These bill presentation and/or bill payment services may be provided by the financial institution computer 110 and/or by the EBPP service provider 115 as desired in various embodiments of the invention.

In certain embodiments, the financial institution computer 110 may include a suitable web portal that facilitates interaction with consumers. One example of a suitable web portal is a web server hosted by a financial institution, such as a bank. As desired, a consumer may log into the web portal and requests various online banking services. For example, a consumer may review various information associated with transactions made utilizing a financial account, for example, cleared items posted to the account. Various suggestions for additional services, such as bill presentment and/or bill payment services, may also be presented to the consumer via the web portal. In certain embodiments of the invention, these suggestions and/or related activation screens may be presented to the consumer based on a consumer selection of a cleared item posted to the account. In certain embodiments of the invention, the web portal may be hosted by the financial institution computer 110. In other embodiments of the invention, a suitable web portal may be hosted by the EBPP service provider 115. Various information may be communicated between the financial institution computer 110 and the EBPP service provider 115 via one or more web service calls or other requests for information that are communicated from one entity to the other entity. For example, the financial institution computer 110 may utilize one or more web service calls to request and receive information from the EBPP service provider 115 regarding one or more payees for which the EBPP service provider 115 supports electronic bill presentment and/or distribution of payments. In this regard, the financial institution computer 110 may present various web sites and/or user interface screens to a consumer that are tailored or branded to the financial institution computer 110 while still including information received from or specific to the EBPP service provider 115.

Additionally, as desired in various embodiments, a communication session with the consumer computer 105 that has been established by one entity (e.g., the financial institution computer 110 or the EBPP service provider 115) may be passed off to another entity. For example, an online banking communication session with a consumer computer 105 may be established by the financial institution computer 110, and the communication session may be passed off to the EBPP service provider 115 by the financial institution computer 110 to facilitate the presentation of one or more suggestions to the consumer and/or the enrollment of the consumer into one or more services provided by the EBPP service provider 115.

With continued reference to the financial institution computer 110 of FIG. 1, the one or more I/O interfaces 140 may facilitate communication between the financial institution computer 110 and one or more input/output devices, for example, one or more user interface devices, such as, a display, keypad, mouse or other pointing device, control panel, touch screen display, remote control, microphone, etc. that facilitate user interaction with the financial institution computer 110. In this regard, one or more user preferences and/or commands associated with the operation of the financial institution computer 110 may be received and processed.

The one or more network interfaces 142 may facilitate connection of the financial institution computer 110 to one or more suitable networks, for example, a wide area network, the Internet, a cellular network, any wired network, any wireless network, etc. In this regard, the financial institution computer 110 may receive and/or communicate information to other network components of the system 100, such as the consumer computer 105 and/or the EBPP service provider 115.

Additionally, the financial institution computer 110 may include or be in communication with one or more memory devices that include one or more databases 180 that are operable to store data that is utilized in various embodiments of the invention, such as profile information for consumers, consumer preferences, log-in and/or access information for consumer, financial account information, other financial information, information associated with identified payees, information associated with bill presentment and/or payment services, and/or information associated with the EBPP service provider 115. The one or more databases 180 may be stored in local memory of the financial institution computer 110, such as in the memory 138 of the financial institution computer 110, and/or by one or more suitable external storage devices, network components, and/or systems that are accessible by the financial institution computer 110. As desired, the financial institution computer 110 may include more or less than the components illustrated in FIG. 1. The financial institution computer 110 illustrated in FIG. 1 is provided by way of example only.

Similar to the financial institution computer 110, the EBPP service provider 115 may be any suitable processor-driven device that facilitates interaction with other network devices of the system 100 and/or the provision of various bill presentation and/or bill payment services. For example, the EBPP service provider 115 may be a network entity that facilitates the collection of bills for a consumer, the electronic presentation of bills to the consumer, the payment of bills on behalf of the consumer via electronic funds transfers and/or paper drafts, and/or the payment of other payees on behalf of the consumer via electronic funds transfers and/or paper drafts. As desired, the EBPP service provider 115 may include any number of special purpose computers or other particular machines, application specific circuits, microcontrollers, personal computers, minicomputers, servers, and the like. These various computers may be associated with an underlying EBPP service provider. In certain embodiments, the operations of the EBPP service provider 115 may be controlled by computer-executed or computer-implemented instructions that are executed by one or more processors associated with the EBPP service provider 115. The instructions may be embodied in one or more software components as desired in various embodiments of the invention. The execution of the instructions may form a special purpose computer or other particular machine that is operable to facilitate the provision of electronic bill presentment and/or distribution of payments to various payees. In certain embodiments, the execution of the instructions may also form a special purpose computer or other particular machine that facilitates the identification of one or more payees from cleared items posted to a financial account and the generation of one or more suggestions and/or related activation screens to enroll a customer for bill presentment and/or payment services with respect to an identified payee. The one or more processors that control the operations of the EBPP service provider 115 may be incorporated into the EBPP service provider 115 and/or in communication with the EBPP service provider 115 via one or more suitable networks. In certain embodiments of the invention, the operations and/or control of the EBPP service provider 115 may be distributed amongst several processing components.

The EBPP service provider 115 may include one or more processors 154, one or more memory devices 156, one or more input/output ("I/O") interface(s) 158, and one or more network interface(s) 160. The one or more memory devices 156 may be any suitable memory devices, for example, caches, read only memory devices, random access memory devices, magnetic storage devices, etc. The one or more memory devices 156 may store data, executable instructions, and/or various program modules utilized by the EBPP service provider 115, for example, data files 162, an operating system 164, a host module 166, and/or a payee prediction module 168. The data files 162 may include any suitable data that facilitates the provision of bill presentment and/or payment services, the identification of payees from one or more cleared items posted to a financial account, and/or the generation of one or more suggestions to enroll the consumer for electronic bill presentment and/or the distribution of payments to an identified payee. For example, the data files 162 may include, but are not limited to, profile information for consumers, consumer preferences, log-in and/or access information for consumers, financial account information, other financial information, information associated with identified payees, information associated with bill presentment and/or payment services, and/or information associated with the financial institution computer 110 or a financial institution associated with the financial institution computer 110. The operating system (OS) 164 may be a suitable software module that controls the general operation of the EBPP service provider 115. The OS 164 may also facilitate the execution of other software modules by the one or more processors 154, for example, the host module 166 and/or the payee prediction module 168. The host module 166 may be a suitable software module, such as a web server or other host server, that facilitates the establishment of a network session with another network device, such as the consumer computer 105 and/or the financial institution computer 110. In this regard, the host module 166 may facilitate interaction between the EBPP service provider 115 and other network devices. For example, the host module 166 may receive and process various web service calls that are communicated to the host module from the financial institution computer 110. In this regard, the financial institution computer 110 can receive bill presentation and/or payment information from the EBPP service provider 115 and utilize that information in the generation of suggestions that are presented to the consumer. As another example, the host module 166 may host a network session for the consumer computer 105 that facilitates the presentation of billing information and/or suggestions to the consumer and/or the receipt of various preferences and/or other input from the consumer. Although not shown in FIG. 1, the EBPP service provider 115 may include a client module that facilitates the establishment of a network session that is hosted by another network device, such as a network session that is hosted by the financial institution computer 110.

The payee prediction module 168 or payee suggestion module 168 may be similar to the payee prediction module 152 described above with reference to the financial institution computer 110. In this regard, the payee prediction module 168 may be a suitable software module that facilitates the identification of one or more payees from cleared items posted to a financial account. For example, the payee prediction module 168 may identify payees from one or more check transactions, converted check transactions, direct debit transactions, and/or debit care transaction. The payee prediction module 168 may additionally be operable to generate suggestions and/or activation screens to establish electronic bill presentation and/or bill payment services for one or more identified payees.

In certain embodiments, the EBPP service provider 115 may include a suitable web portal that facilitates interaction with consumers. One example of a suitable web portal is a web server hosted by a bill presentment and payment service provider, such as a service provider operated by Fiserv, Inc. or CheckFree Corporation. As desired, a consumer may log into the web portal and requests various bill presentment and/or payment services. Based on an identification of payees from one or more cleared items posted to a financial account, various suggestions for additional services, such as bill presentment and/or bill payment services for one or more of the identified payees, may also be presented to the consumer via the web portal.

With continued reference to the EBPP service provider 115 of FIG. 1, the one or more I/O interfaces 158 may facilitate communication between the EBPP service provider 115 and one or more input/output devices, for example, one or more user interface devices, such as, a display, keypad, mouse or other pointing device, control panel, touch screen display, remote control, microphone, etc. that facilitate user interaction with the EBPP service provider 115. In this regard, one or more user preferences and/or commands associated with the operation of the EBPP service provider 115 may be received and processed.

The one or more network interfaces 160 may facilitate connection of the EBPP service provider 115 to one or more suitable networks, for example, a wide area network, the Internet, a cellular network, any wired network, any wireless network, etc. In this regard, the EBPP service provider 115 may receive and/or communicate information to other network components of the system 100, such as the consumer computer 105 and/or the financial institution computer 110.

Additionally, the EBPP service provider 115 may include or be in communication with one or more suitable memory devices that include one or more databases 185 that are operable to store data that is utilized in various embodiments of the invention, such as profile information for consumers, consumer preferences, log-in and/or access information for consumer, financial account information, other financial information, information associated with identified payees, information associated with bill presentment and/or payment services, and/or information associated with the financial institution computer 110. The one or more databases 185 may be stored in local memory of the EBPP service provider 115, such as in the memory 156 of the EBPP service provider 115, and/or by one or more suitable external storage devices, network components, and/or systems that are accessible by the EBPP service provider 115. As desired, the EBPP service provider 115 may include more or less than the components illustrated in FIG. 1. The EBPP service provider 115 illustrated in FIG. 1 is provided by way of example only.

With continued reference to FIG. 1, communication between various network components of the system 100 may be facilitated via one or more suitable networks 120. These networks 120 may include a wide variety of different types of networks as desired in various embodiments of the invention, for example, local area networks, wide area networks, the Internet, cellular network, radio frequency networks, Bluetooth enabled networks, Wi-Fi enabled networks, wired networks, wireless networks, and/or any other network capable of communicating data.

Additionally, the system 100 may include any number of payees/billers 170 in communication with one or more other network components of the system 100. The payees/billers 170 may be operable to communicate billing information to one or more other system components, such as the EBPP service provider 115 and/or the financial institution computer 110. Additionally, the payees/billers 170 and/or various financial institutions associated with the payees/billers 170 may be operable to receive payments from one or more other network components, such as, the EBPP service provider 115 and/or the financial institution computer 110.

With continued reference to FIG. 1, in certain embodiments of the invention, the system 100 may include one or more scrapers 175 that are operable to collect information associated with one or more financial accounts of a consumer. Examples of suitable scrapers include those that are operated by Yodlee™ and CashEdge™. However, in certain embodiments of the invention, suitable scraping technology may be incorporated into the EBPP service provider 115 or another network component of the system 100. A scraper 175 may utilize prestored account credentials and/or login information for the consumer in order to access and/or collect information associated with one or more financial accounts of the consumer. For example, the scraper 175 may utilize login information for the consumer to access the financial institution computer 110 and collect information associated with cleared items that are posted to a financial account of the consumer that is maintained by the financial institution computer 110. The scraper 175 may then provide this information to another network entity, such as the EBPP service provider 115, for analysis.

Those of ordinary skill in the art will appreciate that the system 100 shown in and described with respect to FIG. 1 is provided by way of example only. Numerous other operating environments, system architectures, and device configurations are possible. Accordingly, the invention should not be construed as being limited to any particular operating environment, system architecture, or device configuration. For example, in various embodiments of the invention, any number of consumer, financial institutions, and/or EBPP service providers may be provided. Each of these entities may have any number of respective computers associated with them.

According to an aspect of the invention, information associated with a cleared items history for a financial account of a consumer may be analyzed in order to identify one or more payees for one or more cleared items. One or more suggestions for establishing an identified payee as a payee of the consumer in associated online payment functionality, for activating electronic bill presentment from the identified payee for the consumer, or for establishing recurring payment to the identified payee on behalf of the consumer may be automatically generated as desired and provided to the consumer. In one embodiment, multiple cleared items in a cleared items history may be analyzed in order to generate suggestions for the payee. In another embodiment, a single cleared item may be analyzed. For example, a cleared item may be analyzed when the cleared item is selected by the consumer, and a suggestion may be generated based on the analysis of the cleared item. As desired in various embodiments, generated suggestions and/or partially pre-populated user interface presentations may be communicated and/or presented to the consumer for consideration. The consumer may accept or reject a proposal. Additionally, the consumer may modify presented information and/or provide additional information during an acceptance. In certain embodiments, the acceptance of one proposal may trigger one or more additional or follow-up proposals. For example, the acceptance of a proposal to add a new payee for payment distribution services may trigger a proposal to activate the payee as an electronic biller and/or a proposal to establish recurring payments to the payee.

Figure 2:
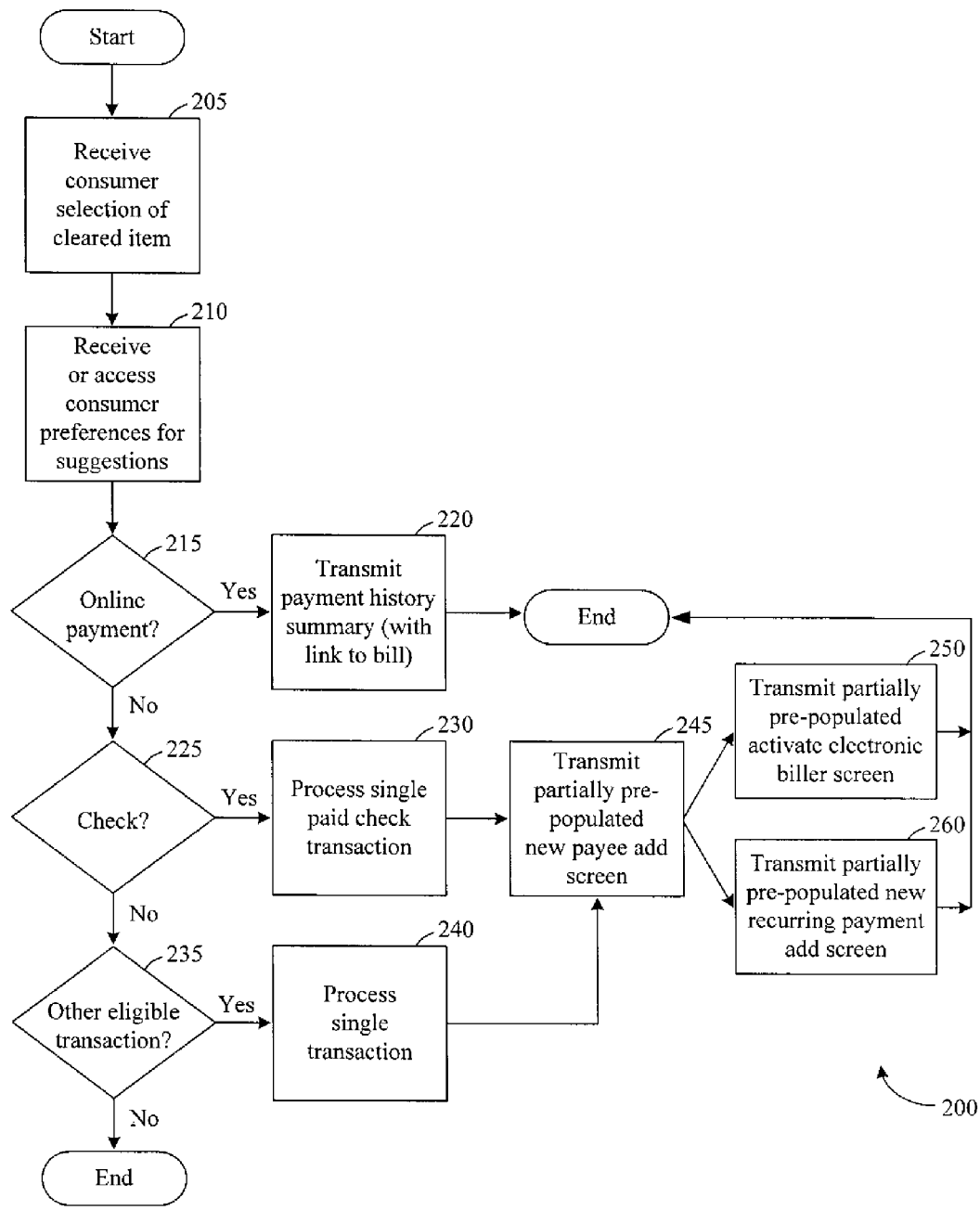
FIG. 2 is a flow chart of an example method for establishing payees for electronic bill presentment and or payment, according to an illustrative embodiment of the invention.

FIG. 2 is a flow chart of an example method 200 for generating payee suggestions and/or activation or set-up transaction screens for electronic bill presentment and or payment, according to an illustrative embodiment of the invention. The method 200 illustrated in FIG. 2 may identify a payee associated with a cleared items posted to a financial account that is selected by a consumer. Additionally, the method 200 may automatically generate one or more suggestions and/or activation or set-up transaction screens for activating bill presentment and/or payment distribution services for one or more of the identified payees. The method 200 may be performed by a suitable payee prediction module, such as the payee prediction module 152 of the financial institution computer 110 illustrated in FIG. 1 or the payee prediction module 168 of the EBPP service provider illustrated in FIG. 1.

The method 200 may begin at block 205. At block 205, a cleared items history may be presented to a consumer, and the consumer may select a cleared item from the cleared items history. For example, a web portal that hosts online banking functionality for the consumer may generate one or more web pages or other graphical user interfaces that facilitate the presentation of a cleared items history to the consumer. The presented cleared items history may include transactions that have been cleared for a financial account of the consumer. As desired in various embodiments, cleared items included in the history may include items for a particular period of time, such as cleared items over the last month or cleared items for a previous quarter. A consumer may select an item in a variety of ways as desired in various embodiments, such as via a mouse click on an item or via a mouse rollover across the item. In certain embodiments, at least one respective link, hyperlink, selection box, or other selectable indicator may be associated with each cleared item, and the consumer may select a cleared item utilizing the selectable indicator. Once a cleared item has been selected by the consumer, operations may continue at block 210.

During the presentation of a cleared items history to a consumer, the cleared items history may be accessed and/or received by the entity that facilitates the presentation, such as the financial institution computer 110 or the EBPP service provider 115. The cleared items history may be accessed or received from one or more local memory devices, from one or more remote memory devices, or from one or more third party data sources. The cleared items history may be obtained through either a "push" form of interprocess communication initiated by a third party, such as a file transfer or message queue post, or a "pull" form of interprocess communication by a receiving entity, such as a web service call. For example, a financial institution computer 110 may access a cleared items history from a local memory. As another example, an EBPP service provider 115 may receive a cleared items history from a financial institution computer 110 or from a scraper. In certain embodiments, the cleared items history may be accessed and/or received in accordance with consumer commands, parameters and/or default parameters. For example, a cleared items history for a predetermined period of time (e.g., the last week, the last month, the last ninety days, a period of time since the last access of cleared items history) and/or for a predetermined number or type of transactions may be accessed and/or received in accordance with consumer commands, parameters and/or default parameters.

At block 210, one or more consumer preferences associated with the generation of preferences may be accessed and/or otherwise received. The consumer preferences may be accessed from local memory, received from a remote or third party data source, received through an interprocess communication with another entity (e.g., received by the financial institution computer 110 from the EBPP service provider 115), and/or received from the consumer. A wide variety of different types of consumer preferences and/or parameters may be utilized as desired in various embodiments of the invention, including but not limited to, preferences associated with the scope of suggestions that are generated for presentation to the consumer.

Examples of parameters associated with the scope of suggestions may include any suitable parameters that facilitate the generation and/or presentation of suggestions to a consumer. In some embodiments, the consumer parameters may relate to the types of suggestions that are generated for presentation to the consumer. For example, a consumer may specify whether they wish to receive suggestions for new payees, new electronic billers, and/or recurring payments. Consumer parameters associated with the scope of suggestions may also relate to the particular payees that are identified and/or a history of suggestions made for the particular payees. For example, a consumer may specify that certain suggestions not be generated for a payee if an identical or similar suggestion for that payee was previously declined by the consumer or previously declined by the consumer during a specified period of time, such as within the last month or last three months. A wide variety of consumer parameters associated with the scope of suggestions may be utilized as desired in various embodiments of the invention, and the examples provided above should not be construed as limiting. In the absence of consumer parameters and/or preferences, default parameters may be utilized as desired. For example, default parameters may indicate that new payee suggestions, new electronic biller suggestions, and/or new recurring payment suggestions be generated.

Once a cleared item has been selected by the consumer, a determination may be made as to the type of cleared item that has been selected. According to an embodiment of the invention, a determination may be made as to whether the selected item is an online payment that has been made on behalf of the consumer by a service provider (e.g., the financial institution computer 110, EBPP service provider 115, etc.), a check transaction, or another eligible transaction that may be processed by a suitable payee prediction module. Other eligible transactions may include, but are not limited to, converted check transactions, direct debit transactions, and/or debit card transactions.

At block 215, a determination may be made as to whether the selected item is an online payment. For example, a suitable text string, such as "online pmt," may be searched for in the item description. As another example, information may be requested from, accessed from, or otherwise obtained from an EBPP service provider, such as EBPP service provider 115, that identifies payees for the consumer at the EBPP service provider 115. For example, the financial institution computer 110 may obtain payee information from the EBPP service provider 115 via one or more suitable web service calls. A payee designation in the item description or other information for the cleared item in the cleared items history may be compared to the payees for the consumer at the EBPP. If a match is found, then it may be determined that the cleared item is an online payment. If it is determined at block 215 that the selected item is not an online payment, then operations may continue at block 225. If, however, it is determined at block 215 that the selected item is an online payment, then operations may continue at block 220.

At block 220, additional information associated with the online payment, a history of the online payment, and/or a history of related payments made to the payee on behalf of the consumer may be accessed or otherwise obtained, and the additional information may be transmitted or otherwise communicated to the consumer. The additional information may be transmitted to the consumer via one or more suitable web pages, user interface screens, or via other suitable communications techniques, such as email or SMS messaging. As desired in various embodiments, the additional information may be obtained from local memory or requested from another entity. For example, the financial institution computer 110 may request additional information associated with the online payment, a history of the online payment, and/or a history of related payments from an EBPP service provider 115 that made the payments on behalf of the consumer. In one embodiment, the financial institution computer 110 may request the additional information through one or more suitable web service calls. As another example, the financial institution computer 110 may link the consumer to the EBPP service provider 115 or pass a communications session off to the EBPP service provider 115, and the EBPP service provider 115 may present additional information to the consumer.

A wide variety of suitable techniques may be utilized as desired to identify additional information associated with an online payment. For example, when identifying payment history information for an online payment, a memory and/or associated data repository that includes information associated with online payments made by a service provider (e.g., the EBPP service provider 115) may be searched for additional information that corresponds to an online payment that has been posted as a cleared item to a financial account. As one example, various information associated with the cleared item, such as a transaction date for the cleared item, a payee name or payee identifier, and/or a transaction amount, may be utilized to search a data repository for additional information associated with a payment history of the online payment. As another example, a service provider identifier (e.g., an identifier for the payment assigned by the EBPP service provider 115) may be identified from the item description of the cleared item, and the service provider identifier may be utilized to search a data repository for additional information associated with a payment history of the online payment.

A wide variety of additional information associated with an online payment may be presented to the consumer as desired in various embodiments of the invention. As discussed above, detailed payment information and/or payment history information may be presented to the consumer. Additionally, if the online payment is associated with a bill that was electronically received by the EBPP service provider 115, the bill or billing information associated with the bill may be presented to the consumer. As desired in various embodiments, detailed payment information and/or payment history information may include a link to an underlying bill and/or to underlying billing information. In certain embodiments, a link or selectable indicator may be provided to the consumer with the additional information, and selection of the selectable indicator by the consumer may facilitate the presentation of billing information to the consumer. Once the additional information is transmitted to and/or presented to the consumer at block 220, the method 200 may end.

At block 225, a determination may be made as to whether the selected item is a check transaction. For example, a suitable text string, such as "check" or another suitable text string, may be searched for in the item description. As desired, the text strings to be searched for may be stored and accessed from one or more suitable memory devices, such as a data repository associated with the financial institution computer 110. As another example, the transaction may be determined to be a check transaction based upon the availability of a stored check image associated with the transaction. If it is determined at block 225 that the selected item is not a check transaction, then operations may continue at block 235. If, however, it is determined at block 225 that the selected item is a check transaction, then operations may continue at block 230.

At block 230, the selected cleared check transaction may be processed. During the processing of the selected cleared check transaction, a payee associated with the check transaction may be identified. Additionally, one or more suggestions and/or set-up transaction screens for activating or enrolling the consumer in various services for the payee, such as electronic bill presentment, payment distribution services and/or recurring payment services, may be generated for presentation to the consumer. The operations for processing a check transaction are discussed in greater detail below with reference to FIG. 4. In certain embodiments of the invention, the operations of block 230 may be optional.

At block 235, a determination may be made as to whether the selected item is another eligible transaction, such as an converted check transaction, a direct debit transaction, or a debit card transaction. For example, a determination may be made as to whether the selected item is an converted check transaction by searching for a suitable text string, such as "automated check" or another suitable text string, in the item description. As another example, a determination may be made as to whether the selected item is a direct debit transaction by searching for a suitable text string, such as "debit" or another suitable text string, in the item description. As yet another example, a determination may be made as to whether the selected item is a debit card transaction by searching for a suitable text string, such as "point of sale purchase," "check-card trans," or another suitable text string, in the item description. A wide variety of different text strings may be searched for as desired in various embodiments of the invention, and the text strings listed above are provided by way of example only. As desired, the text strings to be searched for may be stored and accessed from one or more suitable memory devices, such as a data repository associated with the financial institution computer 110. If it is determined at block 235 that the selected item is not an eligible transaction, then the method 200 may end. If, however, it is determined at block 235 that the selected item is an eligible transaction, then operations may continue at block 240.

At block 240, the eligible transaction may be processed in accordance with its transaction type. Converted check transactions may include check transactions in which an image associated with a check is not available. During the processing of a converted check transaction, a debit card transaction, or a direct debit transaction, a payee associated with the respective transaction may be identified. Additionally, one or more suggestions or partially pre-populated transaction screens for activating or establishing the payee for a particular service on behalf of the consumer, such as electronic bill presentment, payment distribution services and/or recurring payment services, may be generated for presentation to the consumer. The operations for processing converted check transactions, debit card transactions, and/or direct debit transactions are discussed in greater detail below with reference to FIG. 5. In certain embodiments of the invention, the operations of block 240 may be optional. For example, if one or more consumer preferences indicate that the particular transaction type of the selected transaction (e.g., converted check transactions, direct debit transactions, or debit card transactions) are not to be analyzed, then the operations of block 240 may not be performed. Following the processing of the selected transaction at block 240, operations may continue at block 245.

As desired in various embodiments of the invention, a wide variety of different types of suggestions or partially pre-populated transaction screens may be generated for presentation to a consumer when processing a check transaction or other eligible transaction. These suggestions or partially pre-populated transaction screens may include, for example, suggestions or partially pre-populated transaction screens to activate electronic bill presentment for a payee, suggestions or partially pre-populated transaction screens to establish a payee for payment on behalf of the consumer through a service provider, and/or suggestions or partially pre-populated transactions screens to establish a recurring payment to a payee. Suggestions or partially pre-populated transaction screens may be generated by one or more suitable service providers, for example, the financial institution computer 110 and/or the EBPP service provider 115 illustrated in FIG. 1. Once constructed or generated, one or more suggestions or partially pre-populated transaction screens may be presented to a consumer, and the consumer may either accept or decline a suggestion. In addition to or as an alternative to generating suggestions, one or more activation or enrollment screens to activate additional services associated with the payee may be generated and presented to the consumer.

In one example embodiment, the suggestions and/or activation or set-up transaction screens may be presented to the consumer via one or more suitable web pages that are presented by the web portal or other established communications session. In certain embodiments of the invention, suggestions and/or activation or set-up transaction screens may be presented to the consumer in a serial manner, and a consumer response may be received for each suggestion or activation or set-up transaction screen prior to transmitting another instance. In other embodiments, multiple suggestions and/or activation or set-up transaction screens associated with the payee may be presented to the consumer simultaneously. Additionally, as desired, some suggestions and/or activation or set-up transaction screens may be transmitted for presentation based upon a consumer response to an earlier presented suggestion or activation or set-up transaction screen. For example, an electronic bill presentment activation screen or a recurring payment set-up screen may be transmitted after the consumer has accepted a suggestion to add an identified payee as a payee and completed a set-up of the identified payee as a new payee. For purposes of describing FIG. 2, it will be assumed that a new payee set-up screen is transmitted to a consumer and, based upon a set-up of the new payee, one or more other activation or set-up transaction screens may be transmitted to the consumer.

Once a suggestion or activation or set-up transaction screen has been transmitted to and presented to the consumer, a consumer reply to the suggestion or activation or set-up transaction screen may be entered or selected, and the reply may be communicated back to a service provider. For example, the consumer may select an "accept" indication or a "decline" indication associated with a presented suggestion or activation screen.

With continued reference to FIG. 2, a partially pre-populated new payee add screen may be transmitted or otherwise communicated to the consumer at block 245. In certain embodiments, the new payee add screen may be partially pre-populated with a wide variety of information associated with the payee and/or the consumer including, but not limited to, the payee name, an account number of the consumer with the payee, other consumer identifying information, payee contact information, information extracted from the cleared items history, information obtained from corresponding managed payee data, and/or any information received from the payee. The consumer may review the information included in the payee add screen, and the consumer may revise, edit, and or supplement the information as desired. Once the consumer has submitted the add payee transaction, the payee may be added as a new payee for the consumer at the service provider.

At block 250, which may be optional in various embodiments of the invention, a suggestion or a partially pre-populated electronic biller activation screen or display may be transmitted or otherwise communicated to the consumer. For example, an electronic biller activation screen may be transmitted to the consumer if the identified payee has been determined to be an electronic biller for whom bills may be presented electronically. The electronic biller activation screen may facilitate the activation of electronic bill presentment at the service provider of bills of the payee for the consumer. Similar to the new payee add screen, a consumer may review information included in the electronic biller activation screen, and the consumer may modify or supplement the information as desired prior to submitting the transaction.

At block 260, which may be optional in certain embodiments of the invention, a suggestion or a partially pre-populated recurring payment activation screen or display may be transmitted or otherwise communicated to the consumer. For example, a recurring payment activation screen may be transmitted to the consumer if the a pattern of payments to the identified payee has been identified. The recurring payment activation screen may facilitate the establishment and/or activation of recurring payments to the payee on behalf of the consumer. Similar to the new payee add screen, a consumer may review information included in the recurring payment activation screen, and the consumer may modify or supplement the information as desired prior to submitting the transaction.

As an alternative to presenting suggestions and/or activation screens to a consumer via a web portal or other network session, suggestions may be transmitted or communicated to the consumer utilizing a wide variety of proactive communication techniques, for example, email, SMS messaging, etc. These suggestions may include one or more links, such as hypertext links, to a service provider. Selection of a hypertext link by the consumer may establish a communications session with a service provider and allow the consumer to accept or decline a suggestion.

The method 200 may end following block 260.

The operations described and shown in the method 200 of FIG. 2 may be carried out or performed in any suitable order as desired in various embodiments of the invention. Additionally, in certain embodiments, at least a portion of the operations may be carried out in parallel. Furthermore, in certain embodiments, less than or more than the operations described in FIG. 2 may be performed.

Figure 3:
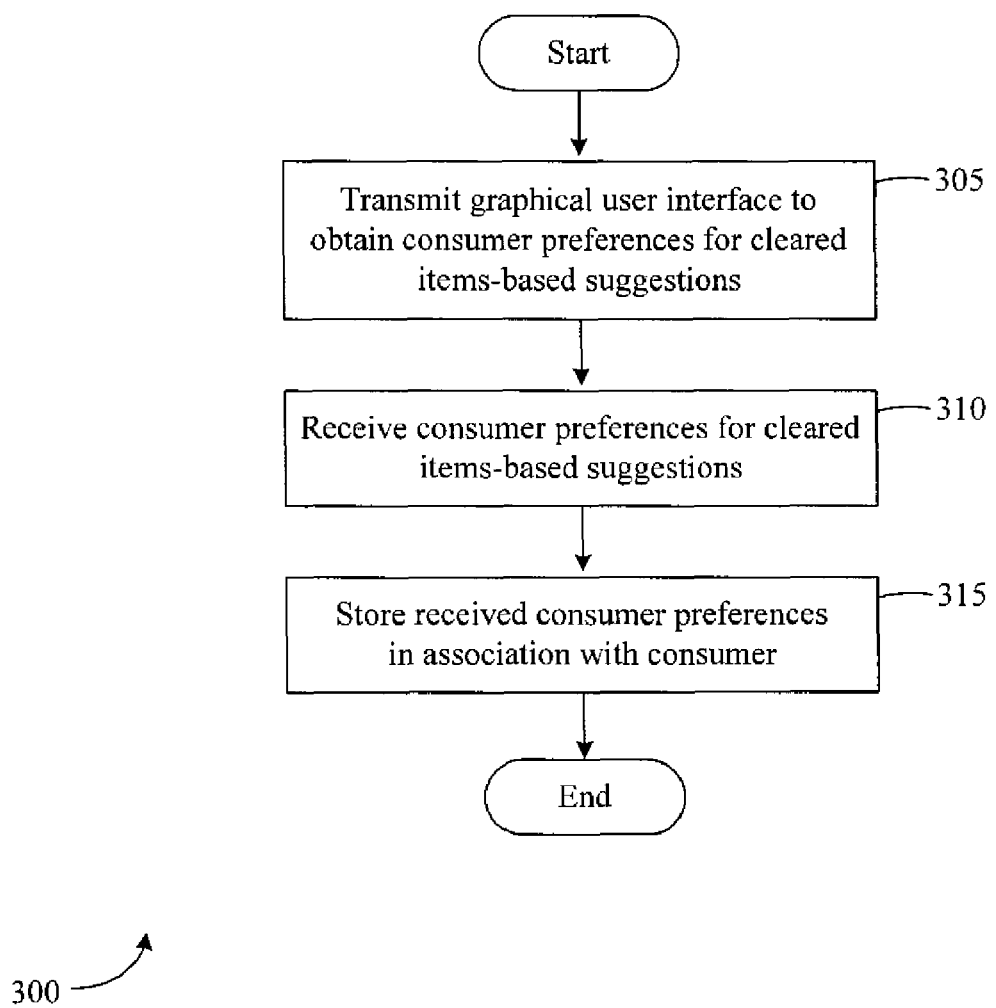
FIG. 3 is a flow chart of an example method for obtaining consumer preferences associated with the identification of payees for payee suggestions, according to an example embodiment of the invention.

FIG. 3 is a flow chart of an example method 300 for obtaining consumer preferences or parameters associated with the identification of payees for payee suggestions, according to an example embodiment of the invention. As set forth above with reference to FIG. 2, a wide variety of consumer preferences and/or parameters may be utilized in accordance with various embodiments of the invention. These preferences may be stored in a suitable memory associated with an entity that maintains data associated with the consumer or an entity that generates suggestions in accordance with various embodiments of the invention, for example, the financial institution computer 110 illustrated in FIG. 1 and/or the EBPP service provider 115 illustrated in FIG. 1. For example, these preferences may be stored in a consumer profile or in other dedicated memory. These preferences may then be accessed during the processing of a cleared items history.

As desired in various embodiments of the invention, consumer preferences may be received via one or more communications, such as web pages and/or other graphical user interfaces, that prompt the consumer to enter one or more preferences. For example, the financial institution computer 110 or the EBPP service provider 115 may present one or more web pages to the consumer, and the consumer may enter or select one or more preferences by entering information into a web page and/or by selecting options presented by a web page. In certain embodiments, consumer preferences may be received using forms of communication other than web pages and/or established network sessions. For example, consumer preferences may be received via electronic mail, via SMS messaging, via telephone by a service representative, via snail mail, etc.

FIG. 3 describes an example method 300 for soliciting and/or receiving consumer preferences for cleared items-based suggestions, according to an illustrative embodiment of the invention. The method 300 may begin at block 305. At block 305, a graphical user interface, such as a web page, may be transmitted or otherwise communicated to a consumer processor, such as the consumer computer 105 illustrated in FIG. 1. The graphical user interface may include one or more prompts and/or selections for receiving consumer preferences. The graphical user interface may be communicated to the consumer from a service provider, such as the financial institution computer 110 or the EBPP service provider 115, via one or more suitable networks, such as the one or more suitable networks 120 illustrated in FIG. 1.

A graphical user interface for obtaining consumer preferences may be communicated to a consumer at a wide variety of different points in time as desired in various embodiments of the invention. For example, a graphical user interface for obtaining consumer preferences may be communicated to a consumer when the consumer enrolls for electronic banking services. As another example, the graphical user interface may be communicated to the consumer based on the receipt of a consumer request. As yet another example, the graphical user interface may be periodically communicated to the consumer based on, for example, a number of logins into an electronic banking service by the consumer (e.g., every login, every fifth login, etc.) and/or a passage of a predetermined period of time (e.g., once a week, once a month, once every three months, etc.).

The graphical user interface may facilitate the collection of consumer preferences from the consumer. For example, the consumer may enter information associated with preferences into the graphical user interface. Additionally and/or alternatively, the consumer may select various preferences from options that are provided to the consumer in the graphical user interface. Once one or more preferences are entered and/or selected by the consumer, the consumer preferences may be transmitted or otherwise communicated back to the entity (e.g., financial institution computer 110 or EBPP service provider 115) that communicated the graphical user interface to the consumer. The preferences may be transmitted via the one or more suitable networks 120. The preferences may be received by the transmitting entity at block 310. The preferences may then be stored in one or more suitable memory devices at block 315. In certain embodiments, the preferences may be stored for subsequent access by a suitable payee prediction module. A wide variety of memory devices may be utilized as desired, such as local memory devices, remote memory devices, and/or memory devices associated with third party data storage systems or entities.

The method 300 may end following block 315.

The operations described and shown in the method 300 of FIG. 3 may be carried out or performed in any suitable order as desired in various embodiments of the invention. Additionally, in certain embodiments, at least a portion of the operations may be carried out in parallel. Furthermore, in certain embodiments, less than or more than the operations described in FIG. 3 may be performed.

Figure 4:
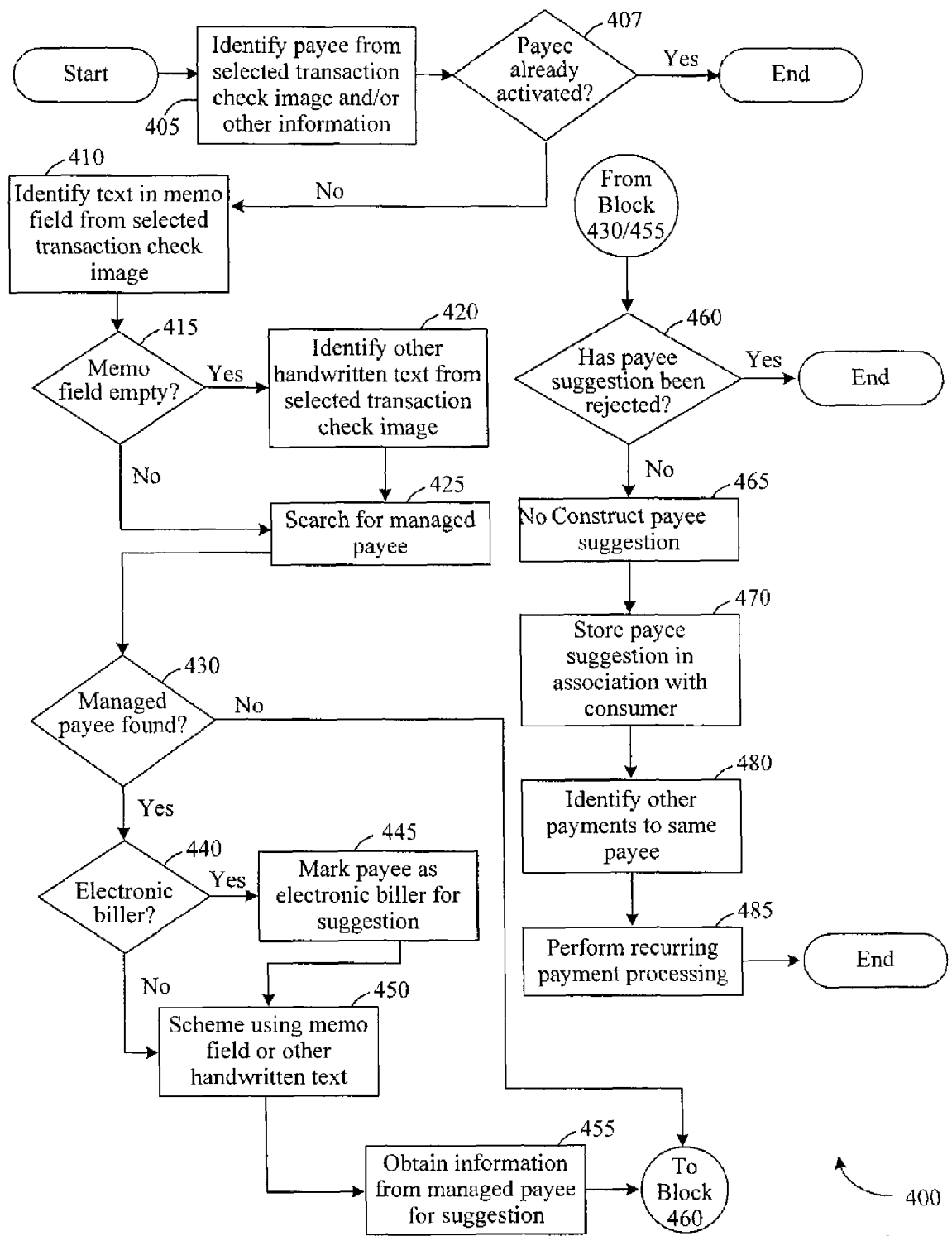
FIG. 4 is a flow chart of an example method for identifying payees from check transactions for the establishment of one or more services associated with the payee, according to an example embodiment of the invention.

FIG. 4 is a flow chart of an example method 400 for identifying a payee from a check transaction and generating one or more suggestions and/or activation screens for the payee, according to an example embodiment of the invention. The method 400 illustrated in FIG. 4 may be carried out by one or more suitable payee prediction modules, for example, payee prediction module 152 or payee prediction module 168 shown in FIG. 1. The method 400 may facilitate the identification of a payee for a check transaction. The method 400 may further determine one or more suggestions associated with the identified payee that may be generated for presentation to the consumer.

The method 400 may begin at block 405 following the selection of a check transaction from a cleared items history by a consumer. At block 405, the payee of the selected check transaction may be identified. In certain embodiments, the payee of the check transaction may be identified from the check image associated with the check transaction. Any number of suitable data recognition techniques, software programs, and/or systems may be utilized to facilitate the recognition and/or interpretation of printed and/or handwritten data within a scanned check image that identifies the payee. For example, intelligent character recognition (ICR) or optical character recognition (OCR) techniques may be utilized. As desired in various embodiments of the invention, a portion or all of the check image may be examined or analyzed in order to identify the payee. For example, a portion of the check image that is examined may be constrained to one or more areas associated with a typical location of a payee line.

In addition to or as an alternative to identifying the payee from the check image, the payee of the check transaction may be identified from any other suitable information included in the cleared items history for the check transaction. For example, the cleared items history may include an item description field for the check transaction, and the payee may be identified from information included in the item description field. Once the payee of the selected check transaction has been identified, operations may continue at block 407.

At block 407, a determination may be made as to whether the identified payee has already been activated as a payee for one or more services provided by a service provider, such as the financial institution 110 or the EBPP service provider 115. For example, a determination may be made as to whether electronic bill presentment services and/or payment distribution services have already been activated for the identified payee. If it is determined at block 407 that the identified payee has already been activated, then the method 400 may end. If, however, it is determined at block 407 that the identified payee has not been activated for one or more services, then operations may continue at block 410.

At block 410, at least a portion of any text included in the memorandum or memo field of the check image may be identified. In certain embodiments of the invention, it may be assumed the text included in the memo field of a check image includes an account number of the consumer at the payee. Similar to identifying the payee from the check image, any number of suitable data recognition techniques, software programs, and/or systems may be utilized to facilitate the recognition and/or interpretation of printed and/or handwritten data included in the memo field of the check image. Additionally, as desired, a portion of the check image that is examined may be constrained to one or more areas associated with a typical location of a memo field or memo line.

At block 415, a determination may be made as to whether the memo field is empty and/or whether information included in the memo field is unrecognizable. If it is determined at block 415 that the memo field is not empty and/or that information included in the memo field is recognizable, then operations may continue at block 425. If, however, it is determined at block 415 that the memo field is empty or that information included in the memo field is unrecognizable, then operations may continue at block 420.

At block 420, other text included in the check image may be identified. For example, other handwritten and/or printed text included in the check image may be identified utilizing any number of suitable data recognition techniques, software programs, and/or systems. In this regard, an account number that is included on the check somewhere other than the memo line may be identified. In certain embodiments, one or more portions of the check, such as portions in an upper area of the check that are separate from typical check information (e.g., bank information, consumer information, payee information, check number, date, courtesy amount, legal amount, payee, signature, etc.), may be examined for printed and/or handwritten text information. If any text is identified, the text may be captured in a similar manner as that utilized to capture text at block 405. Following the identification and/or capture of text at block 420, operations may continue at block 425.

In certain embodiments of the invention, other text included in the check image may be identified even if it is determined at block 415 that the memo field is not empty. For example, it may be determined that the information included in the memo field does not include an account number for the consumer at the payee. As a result of this determination, other text included in the check image may be identified in an attempt to determine an account number for the consumer at the payee.

At block 425, one or more memory devices and/or associated data repositories that include information associated with managed payees may be searched for the identified payee. A managed payee may be a payee about whom a service provider, such as the financial institution computer 110 or the EBPP service provider 115, has information that enables a remittance or payment to that payee to be handled in some improved or optimal fashion. The information may include, but is not limited to, account schemes for improved reliability of accounts receivable posting at the managed payee, account ranges for remittance center identification, other information for remittance center identification, payee preferred payment form (paper or electronic), payee preferred remittance advice form (paper or electronic, and format/syntax), and electronic communication parameters for delivery of electronic credits and/or electronic remittance advice. As desired, the information associated with a managed payee may facilitate the generation of suggestions associated with the managed payee.

The data repositories that are searched may include local data repositories and/or remote data repositories. For example, information that is stored in a data repository at the financial institution computer 110 may be searched. As another example, the financial institution computer 110 may request and/or receive managed payee information from the EBPP service provider 115, such as through one or more web service calls, and the managed payee information may be searched for the identified payee. As yet another example, the financial institution computer 110 may communicate information associated with the identified payee to the EBPP service provider 115 or another entity along with a request to search managed payee information for the identified payee. A search for the identified payee may be conducted by the EBPP service provider or other entity, and an indication of whether the identified payee is a managed payee may be returned to the financial institution computer 110.

A wide variety of suitable methods and/or techniques may be utilized as desired to facilitate the search for the identified payee in the data repository of managed payees. For example, a search may be conducted utilizing the name of the identified payee as a search parameter. As another example, a search may be conducted utilizing a normalized version of the name of the identified payee. The normalization may be conducted utilizing any number of suitable normalization rules as desired in various embodiments of the invention, such as rules that truncate the name of the identified payee to a common name for the payee. As yet another example, multiple searches may be conducted utilizing any number of likely variants of the name of the identified payee.

At block 430, a determination may be made as to whether the identified payee corresponds to a managed payee. In other words, a determination may be made as to whether information associated with the identified payee is stored in a data repository for managed payees. As desired, the determination may include a certainty scoring analysis. For example, a determination may be made as to whether the certainty of a payee being a managed payee is above a predetermined certainty threshold, and the payee may be identified as a managed payee if the certainty satisfies the certainty threshold. If it is determined at block 430 that the identified payee does not correspond to a managed payee, then operations may continue at block 460. If, however, it is determined at block 430 that the identified payee corresponds to a managed payee, then operations may continue at block 440.

At block 440, which may be optional in certain embodiments, a determination may be made as to whether the identified payee is an electronic biller in addition to being a managed payee. In other words, a determination may be made as to whether the identified payee supports the transmission or communication of electronic billing information, such as electronic bill summaries and/or detailed electronic bills, to a service provider (e.g., financial institution computer 110, EBPP service provider 115, etc.) for presentation to the consumer. In certain embodiments, the determination of whether the identified payee is an electronic biller may be made based at least in part on consumer preferences and/or parameters. For example, if a consumer preference specifies that the consumer does not wish to receive suggestions to activate electronic bill presentment, then the determination at block 440 may not be performed. If it is determined at block 440 that the identified payee is not an electronic biller, then operations may continue at block 450. If, however, it is determined at block 440 that the identified payee is an electronic biller, then operations may continue at block 445. At block 445, the identified payee may be marked as an electronic biller. The marking of the payee as an electronic biller may facilitate the generation of one or more suggestions and/or activation screens to activate electronic bill presentment services for the payee. Following the marking of the payee as an electronic biller, operations may continue at block 450.

At block 450, one or more attempts may be made to scheme any potential account number for the consumer at the identified payee. For example, attempts may be made to scheme text extracted from the memo field or another portion of a check image. The attempts to scheme text may facilitate determining whether the text includes a potential account number for the consumer at the identified payee and/or altering a potential account number to satisfy a required account number format for the payee. As desired in various embodiments of the invention, any number of suitable methods and/or techniques may be utilized in an attempt to scheme text that may be associated with a potential account number for the consumer. For example, the text may be compared to one or more rules associated with the proper formatting of an account number for the identified payee obtained, for example, from information associated with the managed payee. A determination may be made as to whether a potential account number satisfies the formatting requirements of an account number for the payee. Additionally or alternatively, the scheming of a potential account number may facilitate certain alteration of the potential account number in order to generate an account number that satisfies formatting requirements of the payee. For example, one or more alphanumeric characters that are typically included in an account number for the payee, such as one or more characters at the beginning or end of an account number, may be added to the potential account number during the scheming.

If text extracted from the check image is successfully schemed at block 450, then the identified account number and/or an altered account number (also referred to as the "before" and "after" versions of the account number) may be added to information that is being assembled for the generation of one or more suggestions and/or activation screens to be presented to the consumer. Operations may then continue at block 455. At block 455, which may be optional in certain embodiments of the invention, information from the managed payee may be obtained for use in generating suggestions. A wide variety of information from the managed payee may be obtained as desired in various embodiments of the invention, including but not limiting to, preferred payee name, preferred payee (or payee remittance center) address, payee customer support telephone number, etc. As desired, the information from the managed payee may be obtained from one or more local memory devices, from one or more remote storage devices, from one or more other network entities, from one or more third party data sources, and/or directly from the payee. In certain embodiments, data from the managed payee may be requested and/or received via one or more suitable networks, such as the networks 120 illustrated in FIG. 1. For example, data from the managed payee may be requested and/or received using one or more suitable web service calls that are communicated to the payee, to the EBPP service provider 115, and/or to another entity. Once information from the managed payee is obtained, operations may continue at block 460.

At block 460, which may be optional in certain embodiments of the invention, a determination may be made as to whether any suggestions for the identified payee have previously been rejected by the consumer. For example, one or more consumer preferences may specify that the consumer does not wish to receive suggestions or certain types of suggestions for particular payees. As another example, one or more consumer preferences may specify that the consumer does not wish to receive suggestions or certain types of suggestions for a payee for a predetermined period of time (e.g., three months, six months, one year, etc.) or indefinitely once a suggestion has been declined or rejected by the consumer. If it is determined at block 460 that one or more suggestions for the identified payee have not previously been rejected, then operations may continue at block 465. If, however it is determined at block 460 that one or more suggestions for the identified payee have previously been rejected by the consumer, then the method 400 may end. Alternatively, additional processing may be conducted as desired in various embodiments to determine whether suggestions should be presented to the consumer for the identified payee. For example, a determination may be made as to whether particular types of suggestions may be presented to the consumer based on consumer preferences. Other determinations for presenting suggestions may be made as desired based at least in part on one or more consumer preferences. If it is determined that suggestions or certain types of suggestions may be presented to the consumer, then operations may continue at block 465.

At block 465, one or more suggestions and/or activation screens for the identified payee may be generated or constructed. As desired, the suggestions and/or activation screens may relate to establishing the payee for one or more services provided by a service provider, such as the EBPP service provider 115, for the consumer. For example, a suggestion may be generated indicating that the payee may be added as a payee of the consumer to enable payments to be submitted to the identified payee on behalf of the consumer by the service provider. These payments may be, for example, electronic payments and/or paper instruments. The suggestion may invite the consumer to activate a payment submission or disbursement service for the identified payee. As another example, a partially pre-populated activation screen to add the payee as a new payee of the consumer for electronic bill presentment and/or online payment functionality may be generated for presentation to the consumer. By adding the identified payee as a new payee, the consumer may instruct the service provider to submit payments to the payee on behalf of the consumer. These payments may be manually submitted at the request of the consumer and/or automatically submitted in a recurring manner. As another example, a suggestion or activation screen may be generated indicating that the payee may be activated to deliver billing information for electronic presentment to the consumer through the service provider. The suggestions and/or activation screens described above are provided by way of example only. Other types of suggestions and/or activation screens may be generated as desired in various embodiments of the invention. Once generated or constructed, suggestions and/or activation screens may be transmitted or otherwise communicated to the consumer in a similar manner as that described in FIG. 2 above with reference to blocks 245-260.

At block 470, which may be optional in certain embodiments of the invention, one or more generated payee suggestions and/or activation screens may be stored in association with the consumer in one or more suitable memory devices and/or associated data repositories, such as databases 175 or databases 180 illustrated in FIG. 1. As one example, the one or more suggestions and/or activation screens may be stored in local memory. As another example, the one or more suggestions and/or activation screens may be stored in a memory associated with another network device by one or more web service calls. For example, a suggestion or activation screen may be generated by the EBPP service provider 115 and stored in a memory associated with the financial institution computer 110. The financial institution computer 110 may present the suggestion or activation screen to the consumer, for example, through an online banking web portal.

At block 480, other transactions included in the cleared items history may be searched and/or examined in order to identify transactions with the same payee. The other transactions that are searched may include other check transactions and/or other types of transactions as desired. A wide variety of suitable methods may be utilized as desired to identify other transactions or payment made to the same payee. For example, a loop may be utilized to analyze the transactions included in the cleared items history. During the processing of each transaction, the payee of the transaction may be identified. The identified payee may be compared to the payee for the selected check transaction. If the identified payee is the same as the payee for the selected check transaction, then the transaction may be marked as including the same payee. Additionally, as desired, information associated with the transaction may be marked and/or stored for subsequent recurring payment processing.

During the comparison of an identified payee for a transaction to the payee of the selected check transaction, it is not necessary that the two payees match exactly. Instead, the payees may be found to correspond even if they are not exactly equivalent. A wide variety of comparison techniques and/or fuzzy logic may be utilized as desired to facilitate the comparison of the payees. For example, the payee names may be normalized to facilitate the comparison. As another example, common variants of the payee for the selected check transaction may be utilized for the comparison. As yet another example, various fuzzy logic techniques may be utilized in the comparison to facilitate the determination of matches even if one or both of the payee names includes a typographical error. As desired, the determination of a correspondence may include a certainty scoring analysis. For example, a correspondence may be identified based on whether the certainty of a comparison is above a predetermined certainty threshold, and a correspondence may be identified if the certainty of a match satisfies the certainty threshold.

At block 485, which may be optional in certain embodiments of the invention, recurring payment processing may be conducted for the selected check transaction. In this regard, multiple payments that are made to the same payee may be analyzed in an attempt to identify one or more patterns associated with the payments made to the payee. Upon the identification or recognition of a pattern, a recurring payment suggestion and/or a recurring payment activation screen for the payee may be generated and/or stored for presentation to the consumer. As an example, monthly payments to a mortgage company may be identified and a suggestion for setting up recurring payments to the mortgage company may be generated. A suitable method for conducting recurring payment processing is discussed in greater detail below with reference to FIG. 6.

The method 400 may end following block 485.

The operations described and shown in the method 400 of FIG. 4 may be carried out or performed in any suitable order as desired in various embodiments of the invention. Additionally, in certain embodiments, at least a portion of the operations may be carried out in parallel. Furthermore, in certain embodiments, less than or more than the operations described in FIG. 4 may be performed. For example, a determination may be made as to whether the identified payee has already been activated as a payee for one or more services provided by a service provider after a payee has been identified as a managed payee. This determination may be in addition to or alternative to the determination made at block 407.

Figure 5:
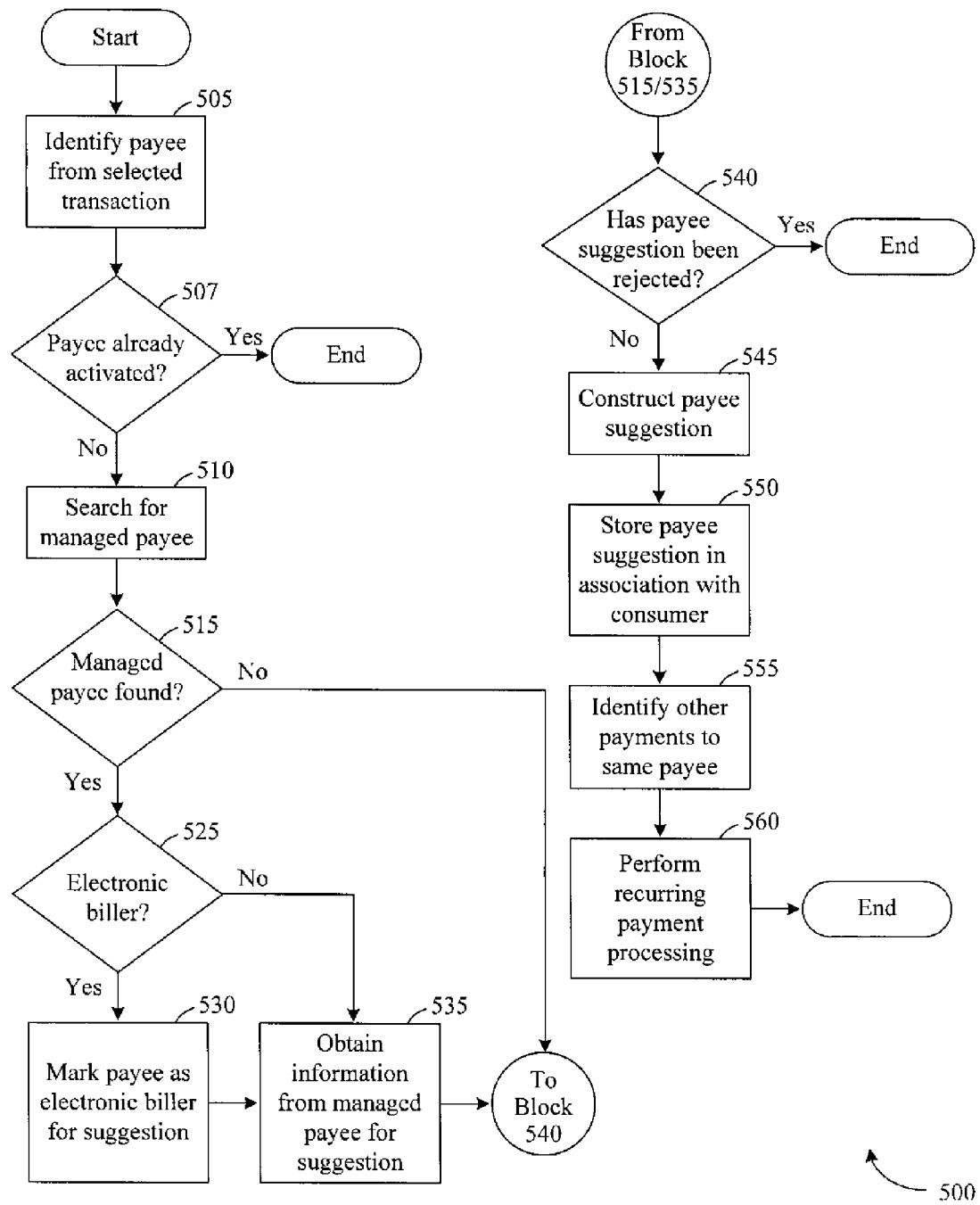
FIG. 5 is a flow chart of an example method for identifying payees from electronic transactions for the establishment of one or more services associated with the payee, according to an example embodiment of the invention.

FIG. 5 is a flow chart of an example method 500 for identifying payees from other types of eligible transactions for the generation of payee suggestions and/or activation screens, according to an example embodiment of the invention. The method 500 illustrated in FIG. 5 may be carried out by one or more suitable payee prediction modules, for example, payee prediction module 152 or payee prediction module 168 shown in FIG. 1. The method 500 may facilitate the identification of a payee for an eligible transaction, for example, a converted check transaction, a debit card transaction, or a direct debit transaction. The transaction may be a transaction that does not have an image associated with it. The method 500 may further determine one or more suggestions associated with the identified payee that may be generated for presentation to the consumer. The method 500 may further facilitate the generation of one or more partially pre-populated activation screens that facilitate the enrollment of the consumer for one or more services associated with the payee, such as electronic bill presentment and/or payment distribution services.

The method 500 illustrated in FIG. 5 may be utilized to process a wide variety of different types of transactions, including but not limited to, converted check transactions, debit card transactions, and/or direct debit transactions. The method 500 may begin at block 505 following the selection of an eligible transaction by a consumer. At block 505, the payee of the selected transaction may be identified. For example, the information associated with the transaction that is stored in the cleared items history may be analyzed in order to determine the payee for the selected transaction. In certain embodiments, the payee may be identified from the item description for the transaction. Once the payee of the selected transaction has been identified, operations may continue at block 507. If the payee of the transaction cannot be identified, then the method 500 may end.

At block 507, a determination may be made as to whether the identified payee has already been activated as a payee for one or more services provided by a service provider, such as the financial institution computer 110 or the EBPP service provider 115. For example, a determination may be made as to whether electronic bill presentment services and/or payment distribution services have already been activated for the identified payee. If it is determined at block 507 that the identified payee has already been activated, then the method 500 may end. If, however, it is determined at block 507 that the identified payee has not been activated for one or more services, then operations may continue at block 510.

At block 510, one or more data repositories and/or memory devices that include information associated with managed payees may be searched for the identified payee. The data repositories that are searched may include local data repositories and/or remote data repositories. For example, information that is stored in a data repository at the financial institution computer 110 may be searched. As another example, the financial institution computer 110 may request and/or receive managed payee information from the EBPP service provider 115, such as through one or more web service calls, and the managed payee information may be searched for the identified payee. As yet another example, the financial institution computer 110 may communicate information associated with the identified payee to the EBPP service provider 115 or another entity along with a request to search managed payee information for the identified payee. A search for the identified payee may be conducted by the EBPP service provider or other entity, and an indication of whether the identified payee is a managed payee may be returned to the financial institution computer 110.

A wide variety of suitable methods and/or techniques may be utilized as desired to facilitate the search for the identified payee in the data repository of managed payees. For example, a search may be conducted utilizing the name of the identified payee as a search parameter. As another example, a search may be conducted utilizing a normalized version of the name of the identified payee. The normalization may be conducted utilizing any number of suitable normalization rules as desired in various embodiments of the invention, such as rules that truncate the name of the identified payee to a common name for the payee. As yet another example, multiple searches may be conducted utilizing any number of likely variants of the name of the identified payee.

At block 515, a determination may be made as to whether the identified payee corresponds to a managed payee. In other words, a determination may be made as to whether information associated with the identified payee is stored in a data repository for managed payees. As desired, the determination may include a certainty scoring analysis. For example, a determination may be made as to whether the certainty of a payee being a managed payee is above a predetermined certainty threshold, and the payee may be identified as a managed payee if the certainty satisfies the certainty threshold. If it is determined at block 515 that the identified payee does not correspond to a managed payee, then operations may continue at block 540. If, however, it is determined at block 515 that the identified payee corresponds to a managed payee, then operations may continue at block 525.

At block 525, which may be optional in certain embodiments, a determination may be made as to whether the identified payee is an electronic biller in addition to being a managed payee. In other words, a determination may be made as to whether the identified payee supports the transmission or communication of electronic billing information, such as electronic bill summaries and/or detailed electronic bills, to a service provider (e.g., financial institution computer 110, EBPP service provider 115, etc.) for presentation to the consumer. In certain embodiments, the determination of whether the identified payee is an electronic biller may be made based at least in part on consumer preferences and/or parameters. For example, if a consumer preference specifies that the consumer does not wish to receive suggestions to activate electronic bill presentment, then the determination at block 525 may not be performed. If it is determined at block 525 that the identified payee is not an electronic biller, then operations may continue at block 535. If, however, it is determined at block 525 that the identified payee is an electronic biller, then operations may continue at block 530. At block 530, the identified payee may be marked as an electronic biller. The marking of the payee as an electronic biller may facilitate the generation of one or more suggestions and/or activations screens to activate electronic bill presentment services for the payee. Following the marking of the payee as an electronic biller, operations may continue at block 535.

At block 535, which may be optional in certain embodiments of the invention, information from the managed payee may be obtained for use in generating suggestions. A wide variety of information from the managed payee may be obtained as desired in various embodiments of the invention, including but not limited to, a preferred payee name, a preferred payee or remittance center address, a customer service telephone number for the payee, etc. As desired, the information from the managed payee may be obtained from one or more local memory devices, from one or more remote storage devices, from one or more other network entities, from one or more third party data sources, and/or directly from the payee. In certain embodiments, data from the managed payee may be requested and/or received via one or more suitable networks, such as the networks 120 illustrated in FIG. 1. For example, data from the managed payee may be requested and/or received using one or more suitable web service calls that are communicated to the payee, to the EBPP service provider 115, and/or to another entity. Once information from the managed payee is obtained, operations may continue at block 540.

At block 540, which may be optional in certain embodiments of the invention, a determination may be made as to whether any suggestions for the identified payee have previously been rejected by the consumer. For example, one or more consumer preferences may specify that the consumer does not wish to receive suggestions or certain types of suggestions for particular payees. As another example, one or more consumer preferences may specify that the consumer does not wish to receive suggestions or certain types of suggestions for a payee for a predetermined period of time (e.g., three months, six months, one year, etc.) or indefinitely once a suggestion has been declined or rejected by the consumer. If it is determined at block 540 that one or more suggestions for the identified payee have not previously been rejected, then operations may continue at block 545. If, however it is determined at block 540 that one or more suggestions for the identified payee have previously been rejected by the consumer, then the method 500 may end. Alternatively, additional processing may be conducted as desired in various embodiments to determine whether suggestions should be presented to the consumer for the identified payee. For example, a determination may be made as to whether particular types of suggestions may be presented to the consumer based on consumer preferences. Other determinations for presenting suggestions may be made as desired based at least in part on one or more consumer preferences. If it is determined that suggestions or certain types of suggestions may be presented to the consumer, then operations may continue at block 545.

At block 545, one or more suggestions and/or activation screens for the identified payee may be generated or constructed. As desired, the suggestions and/or activation screens may relate to establishing the payee for one or more services provided by a service provider, such as the EBPP service provider 115, for the consumer. For example, a suggestion may be generated indicating that the payee may be added as a payee of the consumer to enable payments to be submitted to the identified payee on behalf of the consumer by the service provider. These payments may be, for example, electronic payments and/or paper instruments. As another example, a partially pre-populated activation screen to add the payee as a new payee of the consumer may be generated for presentation to the consumer. By adding the identified payee as a new payee, the consumer may instruct the service provider to submit payments to the payee on behalf of the consumer. As another example, a suggestion or activation screen may be generated indicating that the payee may be activated to deliver billing information for electronic presentment to the consumer through the service provider. The suggestions and/or activation screens described above are provided by way of example only. Other types of suggestions and/or activation screens may be generated as desired in various embodiments of the invention. Once generated or constructed, suggestions and/or activation screens may be transmitted or otherwise communicated to the consumer in a similar manner as that described in FIG. 2 above with reference to blocks 245-260.

At block 550, which may be optional in certain embodiments of the invention, one or more generated payee suggestions and/or activation screens may be stored in association with the consumer in one or more suitable memory devices and/or associated data repositories, such as databases 175 or databases 180 illustrated in FIG. 1. As one example, the one or more suggestions and/or activation screens may be stored in local memory. As another example, the one or more suggestions and/or activation screens may be stored in a memory associated with another network device by one or more web service calls. For example, a suggestion or activation screen may be generated by the EBPP service provider 115 and stored in a memory associated with the financial institution computer 110. The financial institution computer 110 may present the suggestion or activation screen to the consumer, for example, through an online banking web portal.

At block 555, other transactions included in the cleared items history may be searched and/or examined in order to identify transactions with the same payee. The other transactions that are searched may include other transactions of the same transaction type and/or other transactions of a different transaction type. A wide variety of suitable methods may be utilized as desired to identify other transactions or payment made to the same payee. For example, a loop may be utilized to analyze the transactions included in the cleared items history. During the processing of each transaction, the payee of the transaction may be identified. The identified payee may be compared to the payee for the selected transaction. If the identified payee is the same as the payee for the selected transaction, then the transaction may be marked as including the same payee. Additionally, as desired, information associated with the transaction may be marked and/or stored for subsequent recurring payment processing.

During the comparison of an identified payee for a transaction to the payee of the selected transaction, it is not necessary that the two payees match exactly. Instead, the payees may be found to correspond even if they are not exactly equivalent. A wide variety of comparison techniques and/or fuzzy logic may be utilized as desired to facilitate the comparison of the payees. For example, the payee names may be normalized to facilitate the comparison. As another example, common variants of the payee for the selected transaction may be utilized for the comparison. As yet another example, various fuzzy logic techniques may be utilized in the comparison to facilitate the determination of matches even if one or both of the payee names includes a typographical error. As desired, the determination of a correspondence may include a certainty scoring analysis. For example, a correspondence may be identified based on whether the certainty of a comparison is above a predetermined certainty threshold, and a correspondence may be identified if the certainty of a match satisfies the certainty threshold.

At block 560, which may be optional in certain embodiments of the invention, recurring payment processing may be conducted for the selected transaction. In this regard, multiple payments that are made to the same payee may be analyzed in an attempt to identify one or more patterns associated with the payments made to the payee. Upon the identification or recognition of a pattern, a recurring payment suggestion and/or a recurring payment activation screen for the payee may be generated and/or stored for presentation to the consumer. As an example, monthly payments to a mortgage company may be identified and a suggestion for setting up recurring payments to the mortgage company may be generated. A suitable method for conducting recurring payment processing is discussed in greater detail below with reference to FIG. 6.

The method 500 may end following block 560.

The operations described and shown in the method 500 of FIG. 5 may be carried out or performed in any suitable order as desired in various embodiments of the invention. Additionally, in certain embodiments, at least a portion of the operations may be carried out in parallel. Furthermore, in certain embodiments, less than or more than the operations described in FIG. 5 may be performed. For example, a determination may be made as to whether the identified payee has already been activated as a payee for one or more services provided by a service provider after a payee has been identified as a managed payee. This determination may be in addition to or alternative to the determination made at block 507.

Figure 6:
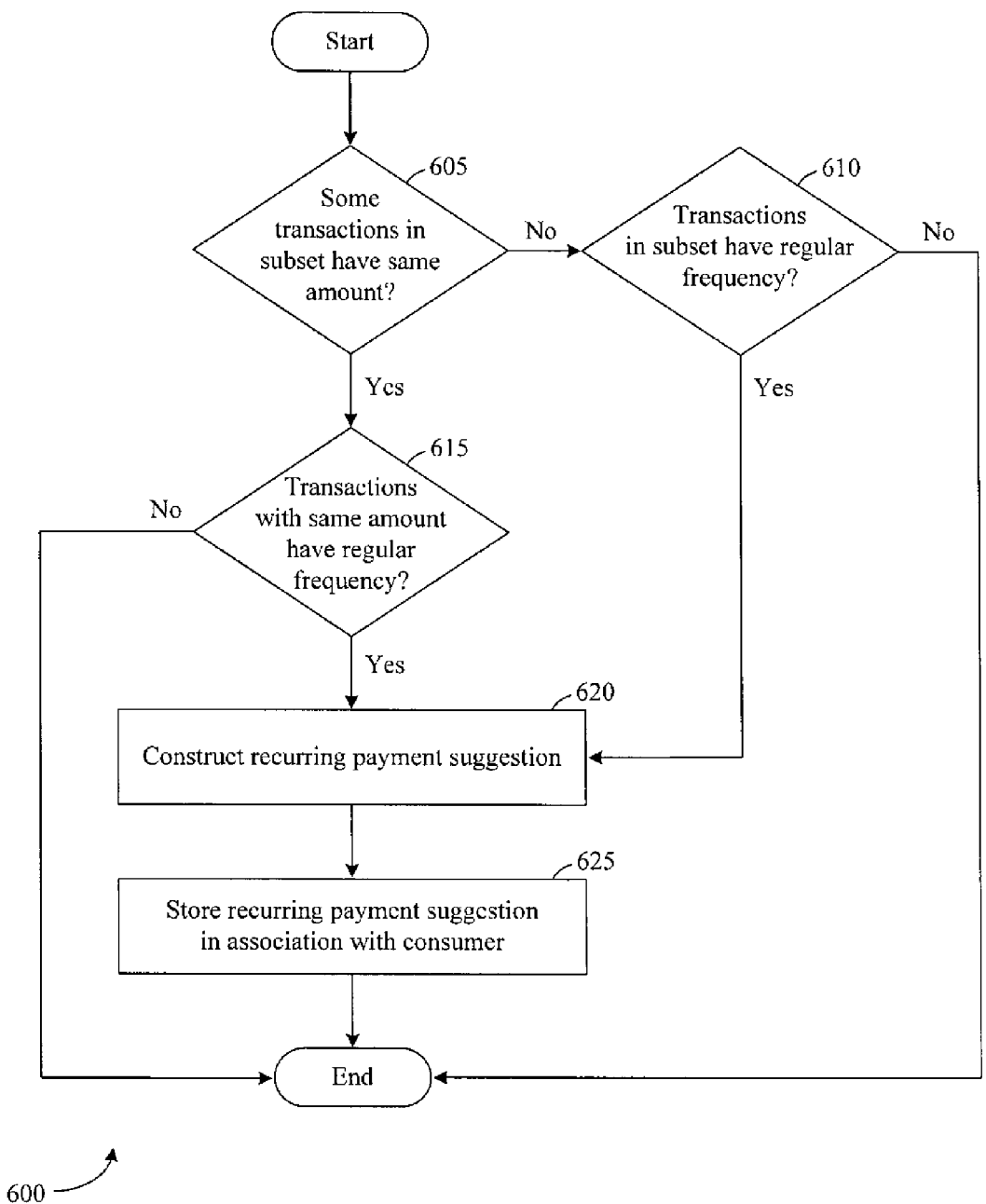
FIG. 6 is a flow chart of an example method for identifying recurring payment opportunities, according to an example embodiment of the invention.

FIG. 6 is a flow chart of an example method 600 for identifying recurring payment opportunities, according to an example embodiment of the invention. The method 600 may be carried out by one or more suitable payee prediction modules, for example, payee prediction module 152 or payee prediction module 168 shown in FIG. 1. The method 600 may facilitate the identification of one or more patterns in a subset of transactions that include the same payee. In an example embodiment of the invention, a subset of transactions that include the same payee may be identified, and the identified subset of transactions may be analyzed in accordance with the method 600 illustrated in FIG. 6.

The method 600 may begin at block 605. At block 605, a determination may be made as to whether multiple transactions in the subset of transactions have the same transaction amount. Any suitable number of techniques may be utilized as desired to determine the amount. For example, the amount of the transaction may be identified and extracted from the information associated with the transaction that is included in the cleared items history. As another example, for check transactions, the amount of the check transaction may be recognized and extracted from a check image. If it is determined at block 605 that multiple transactions in the subset of transactions have the same amount, then operations may continue at block 610. If, however, it is determined at block 605 that multiple transactions in the subset of transactions do not have the same amount, then operations may continue at block 615.

At block 610, a determination may be made as to whether multiple transactions in the subject of transactions have a regular frequency. For example, the transaction dates and/or posting dates of various transactions to the same payee may be identified and/or extracted from information included in the cleared items history. The various dates may be analyzed in an attempt to identify a payment frequency or a payment pattern. For example, a determination may be made as to whether payments are submitted to the payee on a weekly basis, bi-weekly basis, monthly basis, three months basis, bi-annual basis, annual basis, etc. As desired, some amount of variation may be permitted to allow for holidays, reasonable variance in consumer payment, etc. In certain embodiments, an acceptable variance threshold may be established based upon the payment frequency that is being tested for. For example, an acceptable variance threshold of one week may be established when testing for monthly payments. If the variation between two payments exceeds the acceptable threshold, then no payment pattern will be detected. If, however, the variation between the payments satisfies the acceptable threshold, then a payment pattern may be detected. For example, if a first mortgage payment is made on March $1^{st}$ and a second mortgage payment is made on April $3^{rd}$, then a monthly payment pattern may be detected. As another example, if a first payment to a payee is made on March $1^{st}$ and a second payment to the same payee is made on April $23^{rd}$, then no monthly payment pattern will be detected.

If it is determined at block 610 that transactions in the subset of transactions do not have a regular frequency, then the method 600 may end. However, if it is determined at block 610 that transactions in the subset have a regular frequency, then operations may continue at block 620 and one or more recurring payment suggestions may be generated or constructed.

At block 615, a determination may be made as to whether multiple transactions in the subject of transactions having the same amount also have a regular frequency. The determination at block 615 of whether multiple transaction have a regular frequency may be similar to the determination made at block 610 for payment that do not necessarily have the same amount. If it is determined at block 615 that transactions with the same amount do not have a regular frequency, then the method 600 may end. However, if it is determined at block 615 that transactions with the same amount have a regular frequency, then operations may continue at block 620 and one or more recurring payment suggestions may be generated or constructed.

At block 620, one or more recurring payment situations may be identified and one or more new recurring payment suggestions may be constructed or generated. The suggestions that are constructed or generated may include, as desired, at least a portion of the information identified during the various determinations made in accordance with the method of FIG. 6, such as, a transaction amount and/or a frequency. For example, situations in which payments are made to the same payee with a regular frequency may be identified, and a suggestion for submitting recurring payments to the payee on behalf of the consumer may be generated for presentation to the consumer. A recurring payment suggestion may identify the payee, may identify a recurring frequency, may identify a recurring payment amount, and/or may include a first payment date for the recurring payments. In some instances a suggested first payment date may be the next due date for a payment to be made to the identified payee.

Recurring payment suggestions may or may not include a suggested payment amount. For example, if multiple transactions with a regular frequency include the same payment amount, an amount may be suggested in the recurring payment suggestion. However, according to an aspect of the invention, recurring payment suggestions may be generated even if all or a portion of the payments made to a payee do not have the same amount. The generation of these suggestions may cover a wide variety of situations in which a payment amount differs, such as, a situation in which a consumer pays varying amounts of extra principle on a mortgage payment each month or a situation in which a payment is submitted to a credit card company. For these suggestions, a payment amount may or may not be suggested. For example the suggestion may include no payment amount or the suggestion may include a minimum amount of the payments as a suggested payment amount for recurring payments.

At block 625, one or more generated recurring payment suggestions may be stored in association with the consumer in one or more suitable memory devices and/or associated data repositories, such as databases 175 or databases 180 illustrated in FIG. 1. For example, the one or more suggestions may be stored in local memory. As another example, the one or more suggestions may be stored in a memory associated with another network device by one or more web service calls. For example, a recurring payment suggestion may be generated by the EBPP service provider 115 and stored in a memory associated with the financial institution computer 110. When the consumer logs into a web portal provided by the financial institution computer 110, such as an electronic banking web portal, the suggestion may be presented to the consumer. As another example, a suggestion may be generated by the financial institution computer 110 and stored in a memory associated with the EBPP service provider 115. When the consumer logs into a web portal provided by the EBPP service provider 115 and, such as a bill presentation and/or payment web portal, the suggestion may be presented to the consumer.

If a recurring payment suggestion is accepted by the consumer following presentation of the suggestion to the consumer, then a recurring payment service may be initiated at a service provider for the consumer. The recurring payment service may submit payments to a payee on behalf of the consumer with a regular frequency.

The method 600 may end following block 625.

The operations described and shown in the method 600 of FIG. 6 may be carried out or performed in any suitable order as desired in various embodiments of the invention. Additionally, in certain embodiments, at least a portion of the operations may be carried out in parallel. Furthermore, in certain embodiments, less than or more than the operations described in FIG. 6 may be performed.

Accordingly, example embodiments of the invention can provide the technical effects of creating a system, method, and apparatus that identifies a payee from a cleared item posted to a financial account that is selected by a consumer. Additionally, suggestions to enroll a consumer for additional services associated with the payee, such as electronic billing services and/or payment distribution services, may be automatically generated. In this regard, greater convenience may be provided to a consumer and the consumer may avoid the time consuming task of identifying payees for which additional services may be provided.

Various block and/or flow diagrams of systems, methods, apparatuses, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
   obtaining, by a financial system comprising one or more computers, information associated with a cleared item corresponding to a completed transaction and posted to a financial account of a consumer;
   identifying, by the financial system based at least in part on an analysis of the obtained information, a payee associated with the cleared item that has not yet been activated for at least one of directing payments to the payee by a service provider on behalf of the consumer or electronic bill presentment of billing information of the payee to the consumer through the service provider;
   generating, by the financial system, a form for activating, at the service provider, the payee for at least one of directing payment to the payee by the service provider on behalf of the consumer or electronic bill presentment of billing information of the payee to the consumer through the service provider; and
   transmitting, by the financial system, the form to a network entity for presentation to the consumer.

2. The method of claim 1, wherein obtaining information associated with a cleared item posted to a financial account comprises obtaining the information in response to a selection of the cleared item by the consumer.

3. The method of claim 1, wherein the form is at least partially pre-populated with at least a portion of the information obtained for the cleared item.

4. The method of claim 1, further comprising:
   identifying, by the financial system, a pattern of payments made to the payee based at least in part on a history of cleared items posted to the financial account; and
   generating, by the financial system, at least a suggestion to activate the distribution of recurring payments to the payee.

5. The method of claim 4, wherein identifying a pattern of payments made to the payee comprises identifying payments having at least one of a regular frequency or a same transaction amount.

6. The method of claim 1, wherein the cleared item comprises one of a check transaction, a converted check transaction, a debit card transaction, or a direct debit transaction.

7. The method of claim 1, wherein the cleared item comprises a check transaction, and
   wherein identifying a payee comprises identifying a payee from a check image associated with the check transaction.

8. The method of claim 1, further comprising:
   searching, by the financial system, a data repository comprising information associated with managed payees of the service provider for the identified payee; and
   determining, by the financial system based at least in part on the search, that the identified payee is a managed payee of the service provider; and
   accessing, by the financial system, information associated with the managed payee for generating the form.

9. The method of claim 8, wherein searching a data repository comprises searching the data repository utilizing one or more of a name of the identified payee, a normalized name of the identified payee, or a name variant for the identified payee.

10. The method of claim 1, wherein the cleared item comprises a check transaction, and further comprising:
    identifying, by the financial system, a potential account number from a check image associated with the check transaction; and
    scheming, by the financial system, the potential account number utilizing one or more merchant account scheming rules associated with the identified payee.

11. The method of claim 1, further comprising:
    obtaining, by the financial system, at least one consumer preference associated with generating forms; and
    determining, by the financial system, whether to generate the form based at least in part on the obtained at least one consumer preference.

12. The method of claim 1, wherein identifying a payee comprises identifying a payee by one of a financial institution that manages the financial account or an electronic bill presentment and payment service provider.

13. A system, comprising:
    a communications interface operable to transmit one or more generated forms to a network entity for presentation to a consumer and a cleared items associated with a completed transaction utilizing the financial account; and at least one processor operable (i) to obtain information associated with the cleared item posted to a financial account of the consumer, (ii) to identify, based at least in part on the obtained information, a payee associated with the cleared item that has not been activated for directing payments to the payee by a service provider on behalf of the consumer or for electronic bill presentment of billing information of the payee to the consumer through the service provider, (iii) to generate a form for activating, at the service provider, a payee for at least one of directing payment made to the payee by the service provider on behalf of the consumer or electronic bill presentment of billing the information of the payee to the consumer through the service provider, and (iv) to direct the communications interface to transmit the generated form.

14. The system of claim 13, wherein:
the communications interface is further operable to receive a selection of the cleared item by the consumer, and
wherein the at least one processor obtains the information associated with the cleared item based at least in part on the received selection.

15. The system of claim 13, wherein the generated form is at least partially pre-populated with at least a portion of the information obtained for the cleared item.

16. The system of claim 13, wherein the at least one processor is further operable to:
identify a pattern of payments made to the payee based at least in part on a history of cleared items posted to the financial account; and
generate at least a suggestion to activate the distribution of recurring payments to the at least one payee.

17. The system of claim 16, wherein the at least one processor is operable to identify the pattern by identifying payments having at least one of a regular frequency or a same transaction amount.

18. The system of claim 13, wherein the cleared item comprises one of a check transaction, a converted check transaction, a debit card transaction, or a direct debit transaction.

19. The system of claim 13, wherein the cleared item comprises a check transaction, and
wherein the at least one processor is operable to identify the payee by identifying a payee from a check image associated with the check transaction.

20. The system of claim 13, further comprising:
a data repository comprising information associated with managed payees of the service provider,
wherein the data repository is searched for the identified payee and at least a portion of the stored information associated with a managed payee is utilized in the generation of the form if the identified payee is determined to match the managed payee.

21. The system of claim 20, wherein the data repository is searched utilizing one or more of a name of the identified payee, a normalized name of the identified payee, or a name variant for the identified payee.

22. The system of claim 13, wherein the cleared item comprises a check transaction, and wherein the at least one processor is further operable to:
identify a potential account number from a check image associated with the check transaction; and
scheme the potential account number utilizing one or more merchant account scheming rules associated with the identified payee.

23. The system of claim 13, wherein the at least one processor is further operable to:
obtain at least one consumer preference associated with generating forms; and
determine whether to generate the form based at least in part on the obtained at least one consumer preference.

24. A method comprising:
obtaining, by a financial system comprising one or more computers, information associated with a cleared item corresponding to a completed transaction and posted to a financial account of a consumer;
determining, by the financial system based on at least a portion of the obtained information, that the cleared item comprises an online payment made by a service provider to a payee on behalf of the consumer; and
transmitting, by the financial system to a network entity for presentation to the consumer and responsive to determining that the cleared item comprises an online payment, one of (i) a payment history presentation for the online payment or (ii) an electronic bill presentation of a bill associated with the online payment.

25. A system, comprising:
a communications interface operable to transmit a message to a network entity for presentation to a consumer, the communication associated with a completed transaction utilizing the financial account; and
at least one processor operable (i) to obtain information associated with a cleared item posted to the financial account of the consumer, (ii) to determine, based on at least a portion of the obtained information, that the cleared item comprises an online payment made by a service provider to a payee on behalf of the consumer, and (iii) to direct the communications interface to transmit the communication in response to the determination, wherein the communication comprises one of a payment history presentation for the online payment or an electronic bill presentation of a bill associated with the online payment.

* * * * *